US 11,070,830 B2

(12) United States Patent
Leleannec et al.

(10) Patent No.: US 11,070,830 B2
(45) Date of Patent: Jul. 20, 2021

(54) CODING AND DECODING METHOD WITH COLOR CONVERSION AND CORRESPONDING DEVICES

(71) Applicant: INTERDIGITAL MADISON PATENT HOLDINGS, SAS, Paris (FR)

(72) Inventors: Fabrice Leleannec, Mouazè (FR); Franck Galpin, Thorigne-Fouillard (FR); Sébastien Lasserre, Thorigné Fouillard (FR)

(73) Assignee: INTERDIGITAL MADISON PATENT HOLDINGS, SAS, Paris (FR)

( * ) Notice: Subject to any disclaimer, the term of this patent is extended or adjusted under 35 U.S.C. 154(b) by 91 days.

(21) Appl. No.: 15/754,587

(22) PCT Filed: Aug. 16, 2016

(86) PCT No.: PCT/EP2016/069434
§ 371 (c)(1),
(2) Date: Feb. 22, 2018

(87) PCT Pub. No.: WO2017/032646
PCT Pub. Date: Mar. 2, 2017

(65) Prior Publication Data
US 2018/0249166 A1    Aug. 30, 2018

(30) Foreign Application Priority Data
Aug. 24, 2015 (EP) .................................. 15290214

(51) Int. Cl.
*H04N 19/44*    (2014.01)
*G06T 9/00*    (2006.01)
(Continued)

(52) U.S. Cl.
CPC ............... *H04N 19/44* (2014.11); *G06T 9/00* (2013.01); *H04N 19/154* (2014.11); *H04N 19/186* (2014.11); *H04N 19/70* (2014.11)

(58) Field of Classification Search
CPC ...... H04N 19/44; H04N 19/70; H04N 19/186; H04N 19/154; G06T 9/00
See application file for complete search history.

(56) References Cited

U.S. PATENT DOCUMENTS

2008/0175495 A1    7/2008  Segall
2009/0080041 A1 *  3/2009  Fan .......................... H04N 1/60
                                                358/518
(Continued)

FOREIGN PATENT DOCUMENTS

CN    1662071 A    8/2005
CN    1929622 A    3/2007
(Continued)

OTHER PUBLICATIONS

Larson G. W., "LogLuv Encoding for Full-Gamut, High-Dynamic Range Images"; Journal of Graphics Tools, vol. 3, No. 1, Jan. 22, 1999, pp. 15-31.
(Continued)

*Primary Examiner* — Richard T Torrente
(74) *Attorney, Agent, or Firm* — Invention Mine LLC

(57) ABSTRACT

A decoding method including decoding one standard dynamic range (SDR) luminance component and two SDR chrominance components from a bitstream produced by an encoder and color converting the SDR luminance component and the two decoded SDR chrominance components. A dynamic expansion function is applied on the color converted SDR luminance component to obtain a high dynamic range (HDR) luminance component, wherein the dynamic expansion function is the inverse of a dynamic reduction function applied on the HDR luminance component on the
(Continued)

encoder's side. A color transfer operation is applied on the color converted SDR chroma components to obtain an HDR chrominance component and an HDR chrominance component in XYZ color space. A color conversion matrix is applied on the HDR luminance component, the HDR chrominance component and the HDR chrominance component to obtain an HDR picture in RGB color space.

9 Claims, 12 Drawing Sheets

(51) Int. Cl.
  *H04N 19/154* (2014.01)
  *H04N 19/186* (2014.01)
  *H04N 19/70* (2014.01)

(56) References Cited

U.S. PATENT DOCUMENTS

| | | | |
|---|---|---|---|
| 2015/0092850 A1 | | 4/2015 | Talebi et al. |
| 2018/0014040 A1* | | 1/2018 | Tsukagoshi ............ H04N 19/70 |
| 2018/0242006 A1* | | 8/2018 | Kerofsky ............ H04N 19/186 |

FOREIGN PATENT DOCUMENTS

| | | |
|---|---|---|
| CN | 101009851 A | 8/2007 |
| CN | 101072363 A | 11/2007 |
| CN | 101141656 A | 3/2008 |
| CN | 100534206 C | 8/2009 |
| CN | 101009851 B | 7/2010 |
| CN | 101909215 A | 12/2010 |
| CN | 102118624 A | 7/2011 |
| CN | 102388612 A | 3/2012 |
| CN | 101909215 B | 4/2012 |
| CN | 102693538 A | 9/2012 |
| CN | 102118624 B | 12/2012 |
| CN | 102388612 B | 10/2014 |
| CN | 102693538 B | 3/2017 |
| EP | 2406959 | 1/2012 |
| WO | WO2010105036 | 9/2010 |
| WO | 2012122462 A2 | 9/2012 |
| WO | WO2012122426 | 9/2012 |
| WO | WO2012142285 | 10/2012 |
| WO | WO2013046095 | 4/2013 |

OTHER PUBLICATIONS

Baylon et al., Response to Call for Evidence for HDR and WCG Video Coding: Arris, Dolby and InterDigital, International Organisation for Standardization, ISO/IEC JTC1/SC29/WG11, Coding of Moving Pictures and Audio, ISO/IEC JTC1/SC29/WG11 MPEG2015/ M36264, Warsaw, Poland, Jun. 2015, pp. 1-9.

Anonymous, "Parameter values for the HDTV standards for production and international programme exchange", International Telecommunication Union, ITU-R Radiocommunication Sector of ITU, Recommendation ITU-R BT.709-5, Apr. 2002, pp. 1-32.

Anonymous, "Parameters values for ultra-high definition television systems for production and international programme exchange", International Telecommunication Union, ITU-R Radiocommunication Sector of ITU, Recommendation ITU-R Bt.2020-1, Jun. 2014, pp. 1-8.

Anonymous, "High efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265, Apr. 2013, pp. 1-317.

Anonymous, "High Dynamic Range Electro-Optical Transfer Function of Mastering Reference Displays", Society of Motion Picture Television Engineers (SMPTE) Standard, SMPTE ST 2084:2014, Aug. 16, 2014, pp. 1-14.

Wang, L., "Research of Color Image Compression System based on PDVQ" Full-text Database of China Excellent Master's Thesis, Information Technology, First Issue, Jan. 15, 2009.

* cited by examiner

CODING AND DECODING METHOD WITH COLOR CONVERSION AND CORRESPONDING DEVICES This application claims the benefit, under 35 U.S.C. § 365 of International Application PCT/EP2016/069434, filed 16 Aug. 2016, which was published in accordance with PCT Article 21(2) on 2 Mar. 2017, in English, and which claims the benefit of European Patent Application No. 15290214.4 filed 24 Aug. 2015.

1. TECHNICAL FIELD

The present disclosure generally relates to picture/video encoding and decoding. Particularly, but not exclusively, the technical field of the present disclosure is related to decoding of a picture whose pixels values belong to a high-dynamic range.

2. BACKGROUND ART

The present section is intended to introduce the reader to various aspects of art, which may be related to various aspects of the present disclosure that are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

In the following, a color picture contains several arrays of samples (pixel values) in a specific picture/video format which specifies all information relative to the pixel values of a picture (or a video) and all information which may be used by a display and/or any other device to visualize and/or decode a picture (or video) for example. A color picture comprises at least one component, in the shape of a first array of samples, usually a luma (or luminance) component, and at least one another component, in the shape of at least one other array of samples. Or, equivalently, the same information may also be represented by a set of arrays of color samples (color components), such as the traditional tri-chromatic RGB representation.

A pixel value is represented by a vector of n values, where n is the number of components. Each value of a vector is represented with a number of bits which defines a maximal dynamic range of the pixel values.

Standard-Dynamic-Range pictures (SDR pictures) are color pictures whose luminance values are represented with a limited dynamic usually measured in power of two or f-stops. SDR pictures have a dynamic around 10 fstops, i.e. a ratio 1000 between the brightest pixels and the darkest pixels in the linear domain, and are coded with a limited number of bits (most often 8 or 10 in HDTV (High Definition Television systems) and UHDTV (Ultra-High Definition Television systems) in a non-linear domain, for instance by using the ITU-R BT.709 OEFT (Optico-Electrical-Transfer-Function) (*Rec. ITU-R BT.*709-5, April 2002) or ITU-R BT.2020 OETF (*Rec. ITU-R BT.*2020-1, June 2014) to reduce the dynamic. This limited non-linear representation does not allow correct rendering of small signal variations, in particular in dark and bright luminance ranges. In High-Dynamic-Range pictures (HDR pictures), the signal dynamic is much higher (up to 20 f-stops, a ratio one million between the brightest pixels and the darkest pixels) and a new non-linear representation is needed in order to maintain a high accuracy of the signal over its entire range. In HDR pictures, raw data are usually represented in floating-point format (either 32-bit or 16-bit for each component, namely float or half-float), the most popular format being openEXR half-float format (16-bit per RGB component, i.e. 48 bits per pixel) or in integers with a long representation, typically at least 16 bits.

A color gamut is a certain complete set of colors. The most common usage refers to a set of colors which can be accurately represented in a given circumstance, such as within a given color space or by a certain output device. A color gamut is sometimes defined by RGB primaries defined in the CIE1931 color space chromaticity diagram and a white point.

For example, a color gamut is defined by a RGB ITU-R Recommendation BT.2020 color space for UHDTV. An older standard, ITU-R Recommendation BT.709, defines a smaller color gamut for HDTV. In SDR, the dynamic range is defined officially up to 100 nits (candela per square meter) for the color volume in which data are coded, although some display technologies may show brighter pixels.

High Dynamic Range pictures (HDR pictures) are color pictures whose luminance values are represented with a HDR dynamic that is higher than the dynamic of a SDR picture.

The HDR dynamic is not yet defined by a standard but one may expect a dynamic range up to a few thousands nits. For instance, a HDR color volume is defined by a RGB BT.2020 color space and the values represented in said RGB color space belong to a dynamic range from 0 to 4000 nits. Another example of HDR color volume is defined by a RGB BT.2020 color space and the values represented in said RGB color space belong to a dynamic range from 0 to 1000 nits.

Color-grading a picture (or a video) is a process of altering/enhancing the colors of the picture (or the video). Usually, color-grading a picture involves a change of the color volume (color space and/or dynamic range) or a change of the color gamut relative to this picture. Thus, two different color-graded versions of a same picture are versions of this picture whose values are represented in different color volumes (or color gamut) or versions of the picture whose at least one of their colors has been altered/enhanced according to different color grades. This may involve user interactions.

For example, in cinematographic production, a picture and a video are captured using tri-chromatic cameras into RGB color values composed of 3 components (Red, Green and Blue). The RGB color values depend on the tri-chromatic characteristics (color primaries) of the sensor. A first color-graded version of the captured picture is then obtained in order to get theatrical renders (using a specific theatrical grade). Typically, the values of the first color-graded version of the captured picture are represented according to a standardized YUV format such as BT.2020 which defines parameter values for UHDTV.

Then, a Colorist, usually in conjunction with a Director of Photography, performs a control on the color values of the first color-graded version of the captured picture by fine-tuning/tweaking some color values in order to instill an artistic intent.

The problem to be solved is the distribution of a compressed HDR picture (or video) while, at the same time, distributing an associated SDR picture (or video) representative of a color-graded version of said HDR picture (or video).

A trivial solution is simulcasting both SDR and HDR picture (or video) on a distribution infrastructure but the drawback is to virtually double the needed bandwidth compared to a legacy infrastructure distributing adapted to broadcast SDR picture (or video) such as HEVC main 10 profile ("*High Efficiency Video Coding*", SERIES H: *AUDIOVISUAL AND MULTIMEDIA SYSTEMS, Recommendation ITU-T H.265, Telecommunication Standardization Sector of ITU*, April 2013).

Using a legacy distribution infrastructure is a requirement to accelerate the emergence of the distribution of HDR pictures (or video). Also, the bitrate shall be minimized while ensuring good quality of both SDR and HDR version of the picture (or video).

Moreover, backward compatibility may be ensured, i.e. the SDR picture (or video) shall be viewable for users equipped with legacy decoder and display, i.e. in particular, overall perceived brightness (i.e. dark vs. bright scenes) and perceived colors (for instance, preservation of hues, etc.) should be preserved.

Another straightforward solution is to reduce the dynamic range of the HDR picture (or video) by a suitable non-linear function, typically into a limited number of bits (say 10 bits), and directly compressed by the HEVC main10 profile. Such non-linear function (curve) already exist like the so-called PQ EOTF proposed by Dolby at SMPTE (*SMPTE standard: High Dynamic Range Electro-Optical Transfer Function of Mastering Reference Displays, SMPTE ST* 2084:2014).

The drawback of this solution is the lack of backward compatibility, i.e. the obtained reduced version of the picture (video) has not a sufficient visual quality to be considered as being viewable as a SDR picture (or video), and compression performance are somewhat poor.

The present disclosure has been devised with the foregoing in mind.

3. BRIEF SUMMARY

A decoding method is disclosed that comprises:

decoding at least one luma component and two chroma components from a bitstream;

decoding color metadata, said metadata comprising at least one of: a syntax element representative of a color conversion type, a syntax element representative of an inverse transfer type and a syntax element representative of a color conversion matrix;

color converting the luma and/or chroma components responsive to said syntax element representative of a color conversion type;

applying an inverse transfer operation on the color converted luma and/or chroma to obtain a first, a second and a third component responsive to syntax element representative of an inverse transfer type; and applying a color conversion matrix responsive to said syntax element representative of a color conversion matrix to obtain and RGB high dynamic range picture.

A video signal is also disclosed that comprises:

coded data representative of a luma component and two chroma components; and color metadata, said metadata comprising at least one of: a syntax element representative of a color conversion type, a syntax element representative of an inverse transfer type and a syntax element representative of a color conversion matrix.

A coding method is disclosed that comprises:

converting a RGB high dynamic range picture into at least one luma component and two chroma components of lower dynamic range;

coding at least one luma component and two chroma components; and coding color metadata, said metadata comprising at least one of: a syntax element representative of a color conversion type, a syntax element representative of an inverse transfer type and a syntax element representative of a color conversion matrix.

A decoder is disclosed that comprises a communication interface configured to access a bitstream and at least one processor configured to:

decode at least one luma component and two chroma components from said bitstream;

decode color metadata, said metadata comprising at least one of: a syntax element representative of a color conversion type, a syntax element representative of an inverse transfer type and a syntax element representative of a color conversion matrix;

color convert the luma and/or chroma components responsive to said syntax element representative of a color conversion type;

apply an inverse transfer operation on the color converted luma and/or chroma to obtain a first, a second and a third component responsive to syntax element representative of an inverse transfer type; and apply a color conversion matrix responsive to said syntax element representative of a color conversion matrix to obtain and RGB high dynamic range signal.

A coder is disclosed that comprises a communication interface configured to access a RGB high dynamic range picture and at least one processor configured to:

convert said RGB high dynamic range signal into at least one luma component and two chroma components of lower dynamic range;

code at least one luma component and two chroma components; and code color metadata, said metadata comprising at least one of: a syntax element representative of a color conversion type, a syntax element representative of an inverse transfer type and a syntax element representative of a color conversion matrix.

4. BRIEF SUMMARY OF THE DRAWINGS

In the drawings, an embodiment of the present disclosure is illustrated. It shows:

5. DETAILED DESCRIPTION

Figure 1:
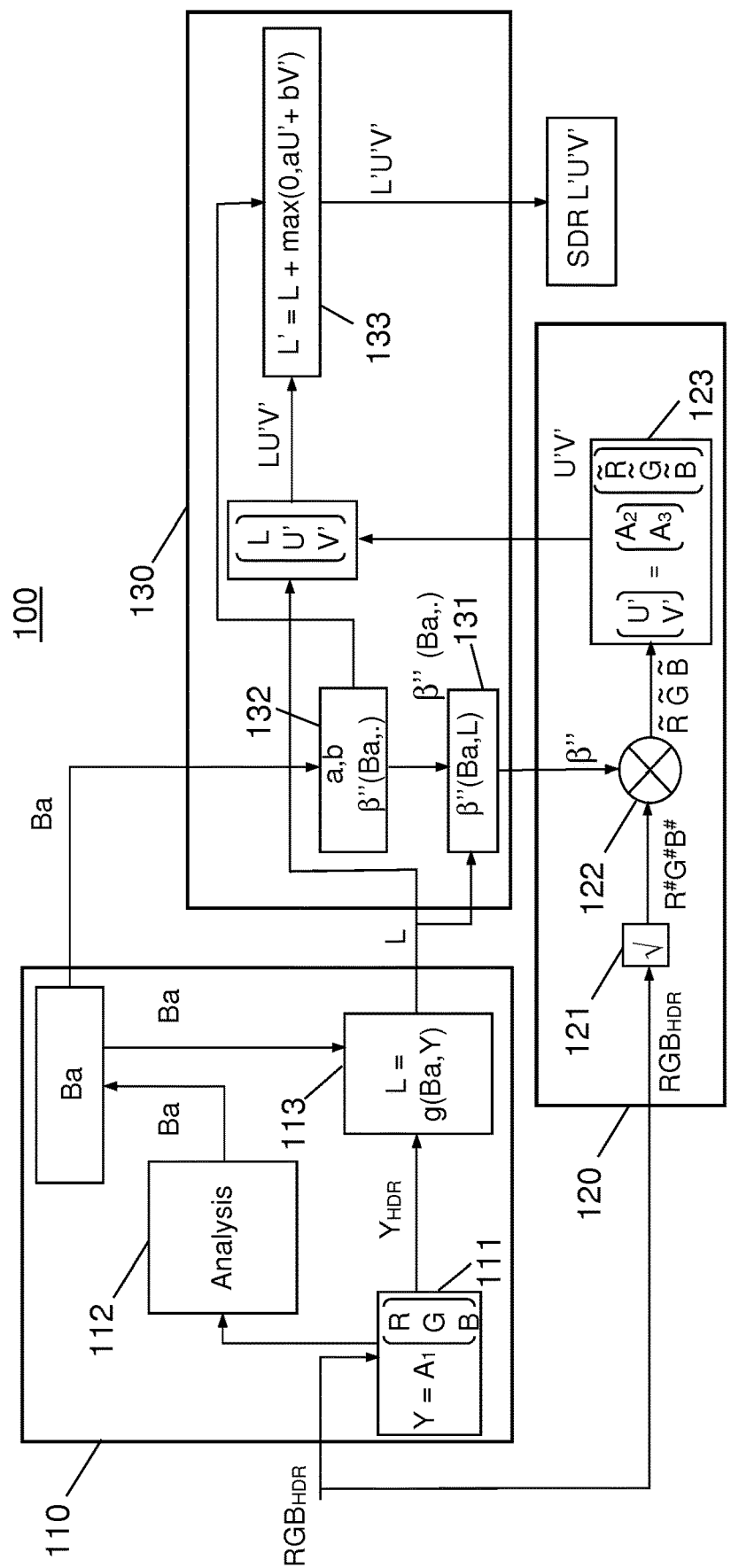
FIG. 1 shows schematically a diagram of the steps of a method of encoding a color picture in accordance with an embodiment of the disclosure.

The present disclosure will be described more fully hereinafter with reference to the accompanying figures, in which embodiments of the disclosure are shown. This disclosure may, however, be embodied in many alternate forms and should not be construed as limited to the embodiments set forth herein. Accordingly, while the disclosure is susceptible to various modifications and alternative forms, specific embodiments thereof are shown by way of example in the drawings and will herein be described in detail. It should be understood, however, that there is no intent to limit the disclosure to the particular forms disclosed, but on the contrary, the disclosure is to cover all modifications, equivalents, and alternatives falling within the spirit and scope of the disclosure as defined by the claims.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to other element, there are no intervening elements present. As used herein the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure.

Although some of the diagrams include arrows on communication paths to show a primary direction of communication, it is to be understood that communication may occur in the opposite direction to the depicted arrows.

Some embodiments are described with regard to block diagrams and operational flowcharts in which each block represents a circuit element, module, or portion of code which comprises one or more executable instructions for implementing the specified logical function(s). It should also be noted that in other implementations, the function(s) noted in the blocks may occur out of the order noted. For example, two blocks shown in succession may, in fact, be executed substantially concurrently or the blocks may sometimes be executed in the reverse order, depending on the functionality involved.

Reference herein to "one embodiment" or "an embodiment" means that a particular feature, structure, or characteristic described in connection with the embodiment can be included in at least one implementation of the disclosure. The appearances of the phrase "in one embodiment" or "according to an embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

While not explicitly described, the present embodiments and variants may be employed in any combination or sub-combination.

The disclosure is described for decoding a color picture but extends to the decoding of a sequence of pictures (video) because each color picture of the sequence is sequentially decoded as described below. In particular, an encoding side and a decoding side of a distribution scheme are described for the encoding and the decoding of a picture or a sequence of pictures. It comprises, on the encoder side, mapping, for example, an HDR picture onto a SDR picture represented in a format compatible with the legacy SDR workflow. Exemplary, but not limited to, the format may be the 8-bit YUV format dedicated to High Definition TV (as defined by the standard ITU-R Rec BT.709) or the 10-bit YUV format dedicated to Ultra High Definition TV (as defined by the standard ITU-R Rec BT.2020). It further comprises encoding the obtained SDR picture by using a legacy SDR image coder. For instance, but not limited to, the coder may be the standard 8-bit h264/AVC main profile or the standard 10-bit HEVC main10 profile of, e.g., HEVC (or any other codec workable by the workflow). Further, the distribution scheme comprises distributing the bit-stream of the obtained encoded SDR picture.

On the decoder side, two scenarios are possible depending on the addressed user.

In a first scenario, a decoded SDR picture is obtained from the distributed bit-stream and is displayed on a SDR-capable device.

In a second scenario, a decoded HDR picture is obtained from the distributed bit-stream by first obtaining a decoded SDR picture and by second applying a mapping from the decoded SDR picture to the decoded HDR picture.

Advantageously, the mapping from a HDR picture to a SDR picture performed by the encoder is invertible such that the inverse mapping from a SDR picture to a HDR picture is applied by the decoder. By doing so, the coding error of the decoded HDR picture, relatively to the HDR picture, is minimized.

An embodiment of an invertible HDR to SDR mapping is described hereafter and is based on a three-step process in which a square-root is used as EOTF.

As shown in FIG. 1, a method 100 of encoding a color picture comprises a luminance dynamic reduction (step 110) that comprises a sub-step 111 of obtaining an original luminance Y from at least one of color components Ec (c=1,2,3) of the color picture and a sub-step 112 of histogram analysis in order to determine a modulation value (also called backlight value) Ba for the picture to be encoded. Different methods can be used to calculate the modulation value, for example, but not limited to, using an average, median, minimum or maximum value of the HDR luminance. These operations may be performed in the linear HDR luminance domain $Y_{HDR,lin}$ or in a non-linear domain like $\ln(Y_{HDR,lin})$ or $Y_{HDR,lin}^{\gamma}$ with $\gamma<1$.

A color picture is considered as having three color components in which the pixel values of the color picture are represented. The present disclosure, although at least partly explained by way of concrete example, is not limited to any color space in which the three components are represented but extends to any color space such as RGB, CIELUV, XYZ, CIELab, etc. As an example, Ec refers to $RGB_{HDR}$ in the Figures. In a sub-step 113, the dynamic of the original luminance Y dynamic is reduced to obtain a luminance component L from the original luminance Y and the modulation value Ba by applying a non-linear function that depends on from the original luminance Y and the modulation value Ba. The luminance component L is a luminance component of the SDR picture, therefore it can also be referred to as a Y component, more precisely as a $Y_{SDR}$ component of a YUV BT709 or YUV BT2020 standard color space.

In a second step 120, two chrominance components C1 and C2 are determined from the color components Ec of the color picture. For the example given in FIG. 1, C1 and C2 refer to U'V', whereas Ec refers to $RGB_{HDR}$. In a sub-step 121, intermediated components Dc (in the example of FIG. 1, Dc refers to $R^\#B^\#G^\#$) are obtained by taking the square root of the color components Ec. For the example shown in FIG. 1, this refers to the square root of $RGB_{HDR}$. In a next sub-step 122, reduced components Fc ($\tilde{R}\tilde{G}\tilde{B}$ for the example shown in FIG. 1) are obtained by a multiplication of the intermediate components Dc by a common multiplicative factor β". The factor β"(Ba,L) depends on the luminance component L and the modulation value Ba. In a next sub-step 123, chrominance components C1 and C2 (U' and V' in FIG. 1) are obtained by multiplying the three reduced components Fc by a matrix, i.e.

$$[C1;C2]=M[F1;F2;F3]$$

where M is a 2×3 matrix that depends on the gamut of the color picture.

In a third step 130, a correction of the luminance component L and the chrominance components C1, C2 is performed to obtain the corrected luminance component L' and the corrected chrominance components C'1 and C'2 (which refers to U'V' to L'U"V" in the figures). This correction obtained by a gamut mapping such that the perceived colors of the gamut G1 of the corrected components L', C'1, C'2 correspond to the perceived color of the gamut G2 of the components Ec of the HDR color picture.

More precisely, in colorimetry and color theory, colorfulness, chroma, and saturation refer to the perceived intensity of a specific color. Colorfulness is the degree of difference between a color and gray. Chroma is the colorfulness relative to the brightness of another color that appears white under similar viewing conditions. Saturation is the colorfulness of a color relative to its own brightness.

A highly colorful stimulus is vivid and intense, while a less colorful stimulus appears more muted, closer to gray. With no colorfulness at all, a color is a "neutral" gray (a picture with no colorfulness in any of its colors is called grayscale). Any color can be described from its colorfulness (or chroma or saturation), lightness (or brightness), and hue.

The definition of the hue and saturation of the color depends on the color space used to represent said color.

For example, when a CIELUV color space is used, the saturation s is defined as the ratio between the chroma $C^*_{uv}$ over the luminance $L^*$.

$$s_{uv} = \frac{C^*_{uv}}{L^*} = \frac{\sqrt{u^{*2}+v^{*2}}}{L^*}$$

The hue is then given by $$h_{uv} = \arctan\frac{v^*}{u^*}$$

According to another example, when a CIELAB color space is used, the saturation is defined as the ratio of the chroma over the luminance:

$$s_{ab} = \frac{C^*_{ab}}{L^*} = \frac{\sqrt{a^{*2}+b^{*2}}}{L^*}$$

The hue is then given by $$h_{ab} = \arctan\frac{b^*}{a^*}$$

These equations are a reasonable predictor of saturation and hue that are in agreement with the human perception of saturation, and demonstrate that adjusting the brightness in CIELAB (or CIELUV) color space while holding the angle a*/b* (or u*/v*) fixed does affect the hue and thus the perception of a same color. In step 150, scaling the color components Ec by a same factor preserves this angle, thus the hue.

Now let us consider that the HDR color picture is represented in the CIELUV color space and a picture I2 that is formed by combining together the luminance component L, whose dynamic range is reduced compared to the dynamic range of the luminance of the color picture I (step 130), and two chrominance components U (=C1) and V (=C2) of the CIELUV color space. The colors of the picture I2 are thus differently perceived by a human being because the saturation and the hue of the colors changed. The method (step 130) determines the chrominance components C'1 and C'2 of a corrected picture I3 in order that the hue of the colors of the corrected picture I3 best match the hue of the colors of the HDR color picture.

In sub-steps 131, 132, the common multiplicative factor β" used in the second step 120 is determined. In a next sub-step 133, L' is generated from L.

The corrected components L', C'1, C'2 are obtained from the luminance component L and the chrominance components C1, C2 by the following equations $$C'1=C1,$$

$$C'2=C2,$$

$$L'=L-mC'1-nC'2$$

where m and n are two real coefficients. On FIG. 1, 'hi' is 'a' and 'n' is 'b'. The real coefficients depend on the gamut of the HDR Rec BT.709 and Bt.2020). Typical values for m and n are m≈n in the interval [0.1,0.5].

According to a variant of the correction, the values of the corrected luminance component L' are always lower than the values of the luminance component L:

$$L'=L-\max(0,mC'_1+nC'_2)$$

This ensures that the values of the corrected luminance component L' do not exceed the values of the luminance component L and thus ensures that no color saturation occurs. The modulation value Ba is encoded in the bitstream F as well as the picture L'C'1C'2, i.e. L'U'V' on the FIG. 1.

Figure 2:
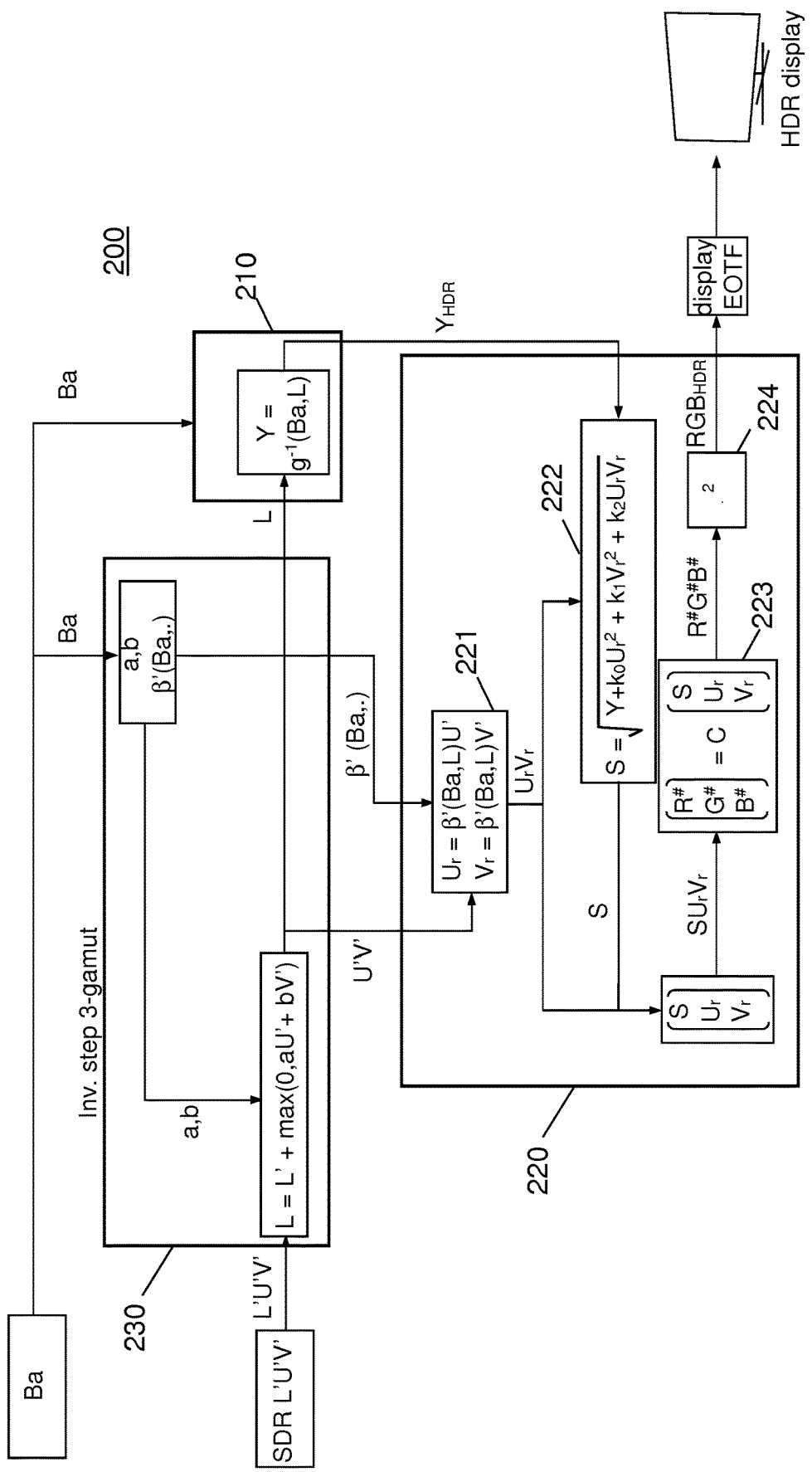
FIG. 2 shows schematically a diagram of the steps of a method of decoding a color picture from at least one bitstream in accordance with an embodiment of the disclosure.

As shown in FIG. 2, a corresponding method 200 of decoding a color picture from a bitstream is schematically illustrated. Decoding Steps 210, 220 and 230 may be regarded as inverting the corresponding encoding steps 110, 120 and 130.

In step 230, corrected luminance and chrominance components L', C'1, C'2 (referring to U'V' in FIG. 2) are obtained from the bitstream F. In a sub step, the luminance component L is obtained by inversing the correction, i.e. by the following equations $$L = L' + mC'1 + nC'2$$

(m and n refer to a and b in the FIG. 2)

According to a variant of the inverse correction, the values of the luminance component L are always higher than the values of the corrected luminance component L':

$$L = L' + \max(0, mC'_1 + nC'_2)$$

This embodiment is advantageous because it ensures that the luminance component L does not exceed a potential clipping value that is usually used by the decoder to define a luminance peak.

Figure 3:
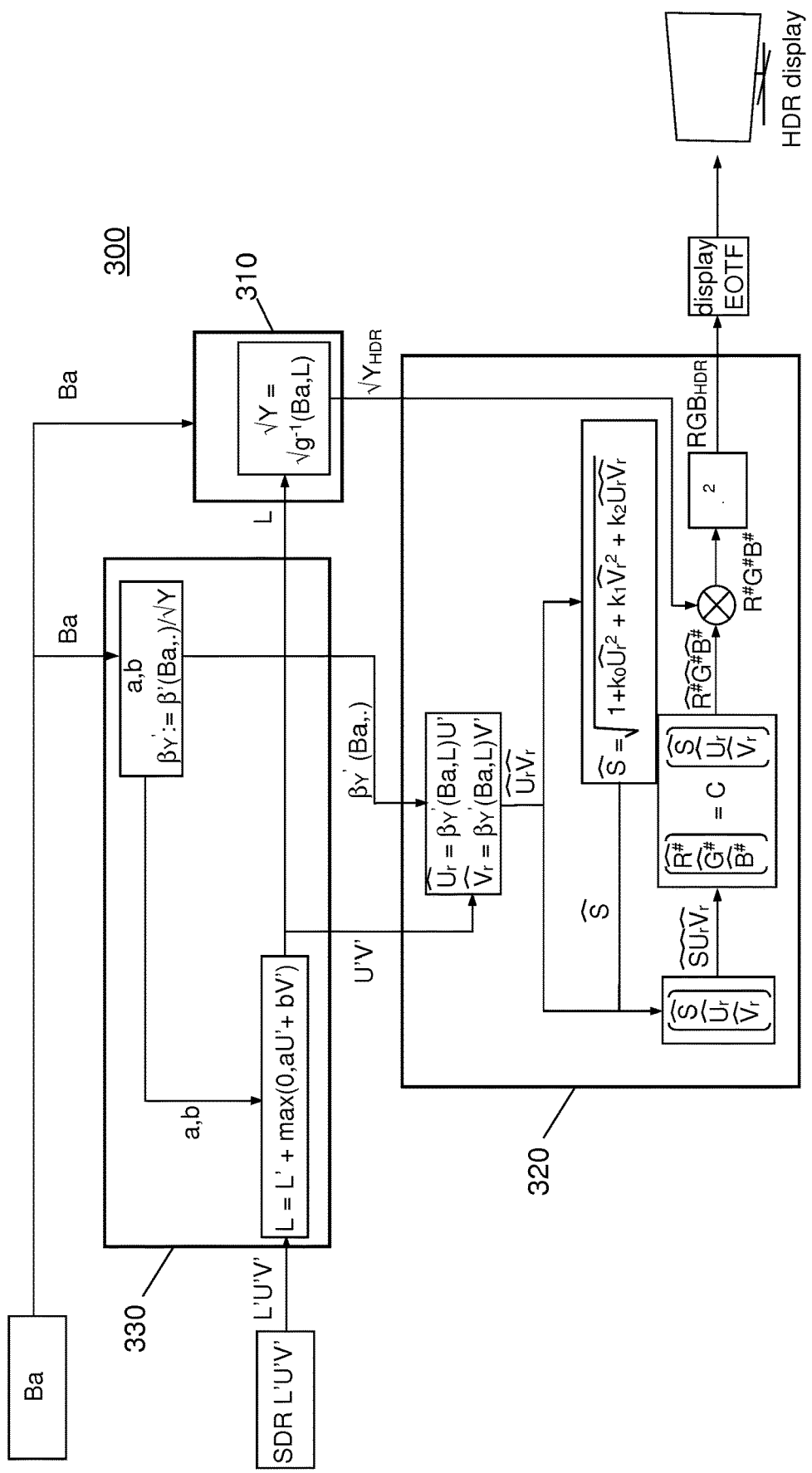
FIG. 3 shows schematically a diagram of the steps of a method of decoding a color picture from at least one bitstream in accordance with another embodiment of the disclosure.

In step 210, a nonlinear dynamic expansion function is applied to the luminance L in order to generate a first component (Y in FIG. 2 or sqrt(Y) in FIG. 3) which is an expanded range luminance, which is an inverse of a dynamic reduction function that has been applied to an original luminance component obtained when encoding the color picture, e.g. $Y_{HDR} = f^{-1}(L_{SDR})$, more precisely $g^{-1}(Ba, L)$.

In step 220, at least one color components Ec (in the shown example $RGB_{HDR}$) of the color picture to be decoded are recovered from the corrected chrominance components C'1, C'2 (In the example shown: U'V') and the first component Y (or sqrt(Y)). In a sub-step 221 a multiplication of the corrected chrominance components C'1, C'2 by a common multiplicative factor β' is performed to obtain the intermediate chrominance components ($C1_r, C2_r$, referring $U_r V_r$ shown in the example of FIG. 2 and $\widehat{C1_r}, \widehat{C2_r}$ referring to $\widehat{U_r}, \widehat{U_r}$, shown in FIG. 3), which are used in a further sub-step 222 for obtaining a second component S, i.e., and referring to the component notation used for the example shown in FIG. 2, a value S determined by $S = \sqrt{Y + k_0 U_r^2 + k_1 V_r^2 + k_2 U_r V_r}$. In a further sub-step 223, $R^\# G^\# B^\#$ are recovered from $SU_r V_r$: $[R^\#; G^\#; B^\#] = Mat_{3 \times 3} [S; U_r; V_r]$. The color components of the decoded color picture $RGB_{HDR}$ are determined in a next sub-step 224 as the squares of $R^\# G^\# B^\#$.

In other words, the method allows, for example, a SDR to HDR de-mapping that recovers R#G#B# representative of the RGB HDR components, from a SDR luma component L and two SDR chroma components UV, wherein a HDR luminance component Y is deduced from L, a value T is computed as a linear combination of $U^2, V^2$ and $U^*V$, S is computed as the square root of Y-T and $R^\# G^\# B^\#$ is then determined as the product of a 3×3 matrix and SUV, applied to each pixel of an input SDR picture. The 3×3 matrix is, for example, the inverse of the RGB->YUV matrix defined in ITU-R BT709/2020, i.e. $C = A^{-1}$.

The described decoding scheme allows the distribution of a compressed HDR picture while, at the same time, distributing an associated SDR picture representative of a color-graded version of said HDR picture However, the decoding can be further enhanced, as compression loss may introduce inaccuracies when decoding and displaying the HDR picture, such that the numerical stability or robustness of the decoding may not always be guaranteed.

The further disclosure sets out to provide a method of decoding a color picture from a bitstream that provides an additional increase in robustness. The method comprises:

obtaining a first component by applying a nonlinear dynamic expansion function to a luminance component obtained from the bitstream;

obtaining a second component by taking a square root of a difference between a value determined by the first component and a linear combination of a product and square values of two chrominance components obtained from the bitstream; and obtaining at least one color component of the color picture to be decoded at least from said second component and said two chrominance components.

This allows to apply a nonlinear dynamic expansion function which is not necessarily the inverse of the corresponding nonlinear dynamic reduction function that has been applied during encoding, in order to apply a customizable boundary at least to the luminance component, for example to take into account restrictions implied by the processing hardware. Further, the dependency of the square root function on the first component generated by the actually selected nonlinear dynamic expansion function allows to adapt the calculation of the second component not only to the introduced boundary but also to influence the avoidance of a non-defined difference result, thereby enabling enhanced numerical stability.

According to an embodiment, the second component is obtained by taking the square root of the difference between the value determined by the first component and said linear combination only if said value is equal to or greater than said linear combination, and said second component is set equal to zero and the two chrominance components are multiplied by a common factor otherwise. This allows handling the case of the second component being determined to be a non-real figure. Handling of this error case may otherwise depend on the applied hardware error handling functionality. This exception is resolved by setting the second component to 0. However, replacing an imaginary value by zero is equivalent to increasing the luminance. If the second component would be set to 0 without also applying the common factor to the chrominance components would practically lead to very bright pixels appearing where the second component has been set to zero.

According to one embodiment, the common factor is a ratio of said first component, i.e. the value of said component, over a square root of said linear combination.

In this embodiment, the nonlinear dynamic expansion function is, e.g., an inverse of a dynamic reduction function that has been applied to an original luminance component obtained when encoding the color picture and said value determined by said first component is equal to said original luminance component. In this case, the nonlinear dynamic expansion function provides the original luminance component as said first component and the second component is determined as a square root of the difference between the originally encoded luminance and described linear combination.

According to another embodiment, the common factor is the reciprocal of a square root of said linear combination.

In this embodiment the nonlinear dynamic expansion function is a square root of an inverse of a dynamic reduction function that has been applied to an original luminance component obtained when encoding the color picture, and the value determined by said first component is equal to 1. Further, the obtaining at least one color component of the color picture to be decoded comprises multiplying the at least one color component by the first component. This introduces normalization by the square root of the original luminance component and, thereby, sets boundaries to the chrominance components and the second component, such that hardware implementation can be simplified. Finally, the described multiplication removes the applied normalization.

In order to apply a corresponding scaling to the two chrominance components, according to an embodiment, the step of obtaining the two chrominance components comprises scaling each of the two chrominance components by a factor that depends on the first component.

For example, said scaling comprises dividing the two chrominance components by the first component, i.e. by the same normalization factor that is also applied to the luminance, before determining the linear combination.

In an embodiment, said factor also depends on a backlight value of the picture being decoded, obtained from the original luminance component.

In an embodiment, the second component is determined using a look up table for faster processing.

According to an embodiment, said obtaining at least one color component of the color picture to be decoded at least from said second component and said two chrominance components comprises determining said at least one color component as a linear combination of the second component and the two chrominance components.

Any of the following embodiments may be applied to other color spaces than RGB or YUV, even if described with example reference to those.

As an example embodiment, a SDR to HDR de-mapping method recovers $R^\#G^\#B^\#$ representative of the RGB HDR components, from a SDR luma component L and two SDR chroma components UV, wherein a HDR luminance component Y is deduced from L, a value T is computed as a linear combination of $U^2, V^2$ and $U*V$. S is essentially computed as the square root of Y−T
  i. if T≤Y then S=sqrt(Y−T)
  ii. if T>Y then U and V are multiplied by a common factor F and S is set to zero.
$R^\#G^\#B^\#$ is then computed as a product of a 3×3 matrix and SUV. The method is applied to each pixel of an input SDR image. Further, the common factor F can be set to $Y/\sqrt{T}$.

As another example embodiment, a SDR to HDR de-mapping method recovers $R^\#G^\#B^\#$ representative of the RGB HDR components from a SDR luma component L and two SDR chroma components UV, wherein the square root of the HDR luminance component $\sqrt{Y}$ is deduced from L, T is computed as a linear combination of $U^2, V^2$ and $U*V$, and S is essentially computed as the square root of 1−T
  i. if T≤1 then S=sqrt(1−T)
  ii. if T>1 then U and V are multiplied by a common factor F and S is set to zero
$\widehat{R^\#} \, \widehat{G^\#} \, \widehat{B^\#}$ is then computed as the product of a 3×3 matrix and SUV. $R^\#G^\#B^\#$ is the multiplication of $\widehat{R^\#} \, \widehat{G^\#} \, \widehat{B^\#}$ by $\sqrt{Y}$, applied to each pixel of an input SDR picture. Further, the common factor F is $1/\sqrt{T}$. In an embodiment, F can be applied at the same time as the final multiplication by $1/\sqrt{T}$, i.e. multiplication by $F/\sqrt{T}$ instead.

The described embodiment allows a simple hardware implementation of the decoder with intermediate register sizes that do not depend on the peak lumianace of the color image A color picture I is considered as having three color components in which the pixel values of the color picture are represented. The present disclosure is not limited to any color space in which the three components are represented but extends to any color space such as RGB, CIELUV, XYZ, CIELab, etc.

Referring to FIG. 3, a diagram of the steps of a method 300 of decoding a color picture from at least one bitstream in accordance with an embodiment of the disclosure is schematically shown. The shown embodiment is actually a modification of the decoding method illustrated in FIG. 2, now ascertaining that clear bounds are always available for the processed luminance and chrominance components, namely of $Y, U_r, V_r, S$. Only changes between the embodiments will be explained in detail.

In step 310, the nonlinear dynamic expansion function is a square root of an inverse of a dynamic reduction function that has been applied to an original luminance component obtained when encoding the color picture, which reduces the upper bound of the first component to $\sqrt{Y}$. Normalization by $1/\sqrt{Y}$ is introduced, followed by a modified chrominance reconstruction step 320 and then a renormalization by $\sqrt{Y}$.

The HDR luminance Y is a linear combination of the components Ec. Hereinafter, as an example of Ec, it is referred to $RGB_{HDR}$.

$$Y = A_1 \begin{bmatrix} R \\ G \\ B \end{bmatrix} = A_1 \begin{bmatrix} R^{\#2} \\ G^{\#2} \\ B^{\#2} \end{bmatrix}$$

where we defined $R^\#:=\sqrt{R}, G^\#:=\sqrt{G}, B^\#:=\sqrt{B}$

As a consequence, up to some constants, Ec, i.e. RGB in the shown example, are bounded by Y and Dc, i.e. $R^\#G^\#B^\#$ in the shown example, are bounded by $\sqrt{Y}$. Also, as one gets from the encoder side, $U_r, V_r$ as a linear combination of $R^\#G^\#B^\#$, i.e.

$$\begin{bmatrix} A_2 \\ A_3 \end{bmatrix} \begin{bmatrix} R^\# \\ G^\# \\ B^\# \end{bmatrix} = \begin{bmatrix} U_r \\ V_r \end{bmatrix},$$

The two variables are bounded by $R^\#G^\#B^\#$, thus by $\sqrt{Y}$. It follows that, referring back to the embodiment shown in FIG. 2, in the definition of S, $$S = \sqrt{Y + k_0 U_r^2 + k_1 V_r^2 + k_2 U_r V_r}$$

the term under the square root is bounded by Y, and S is bounded by $\sqrt{Y}$. Hence, the input variables $U_r, V_r$, the intermediate variable S, and the output variables $R^\#G^\#B^\#$ of the decoding process are all bounded by $\sqrt{Y}$. Therefore, the multiplicative factor $\beta'$ used in the decoding method illustrated in FIG. 2 is replaced by $\beta_Y'$ in the embodiment shown in FIG. 3, such that, instead of processing $U_r$ and $V_r$, $U_r/\sqrt{Y}$ and $V_r/\sqrt{Y}$ are processed. Further a re-scaling of the output back by $\sqrt{Y}$ is introduced.

In other words, the multiplicative factor $\beta'(Ba,L)$ is replaced (especially in step 330 compared to step 230) by $\beta_Y'(Ba,L):=\beta'(Ba,L)/\sqrt{Y}$ in order to get the normalized inputs $\widehat{U_r} = U_r/\sqrt{Y}$ and $\widehat{V_r} = V_r/\sqrt{Y}$ At the output, the decoded $\widehat{R^\#} \, \widehat{G^\#} \, \widehat{B^\#}$ are scaled back by a multiplication by $\sqrt{Y}$.

FIG. 3 illustrates a SDR to HDR inverse mapping method that recovers $R^\#G^\#B^\#$ representative of the RGB HDR components, from a SDR luma component L and two SDR chroma components UV, wherein the square root of the HDR luminance component $\sqrt{Y}$ is deduced from L, a value $\hat{T}$ is computed as a linear combination of $U^2, V^2$ and $U*V$, the second component S is computed as the square root of the difference $1-\hat{T}$, and wherein $\widehat{R^\#}\ \widehat{G^\#}\ \widehat{B^\#}$ is the product of a 3×3 matrix and SUV and $R^\#G^\#B^\#$ is the multiplication of $\widehat{R^\#}\ \widehat{G^\#}\ \widehat{B^\#}$ by $\sqrt{Y}$, applied to each pixel of an input SDR image. Furthermore, U and V are divided by $\sqrt{Y}$.

Figure 4:
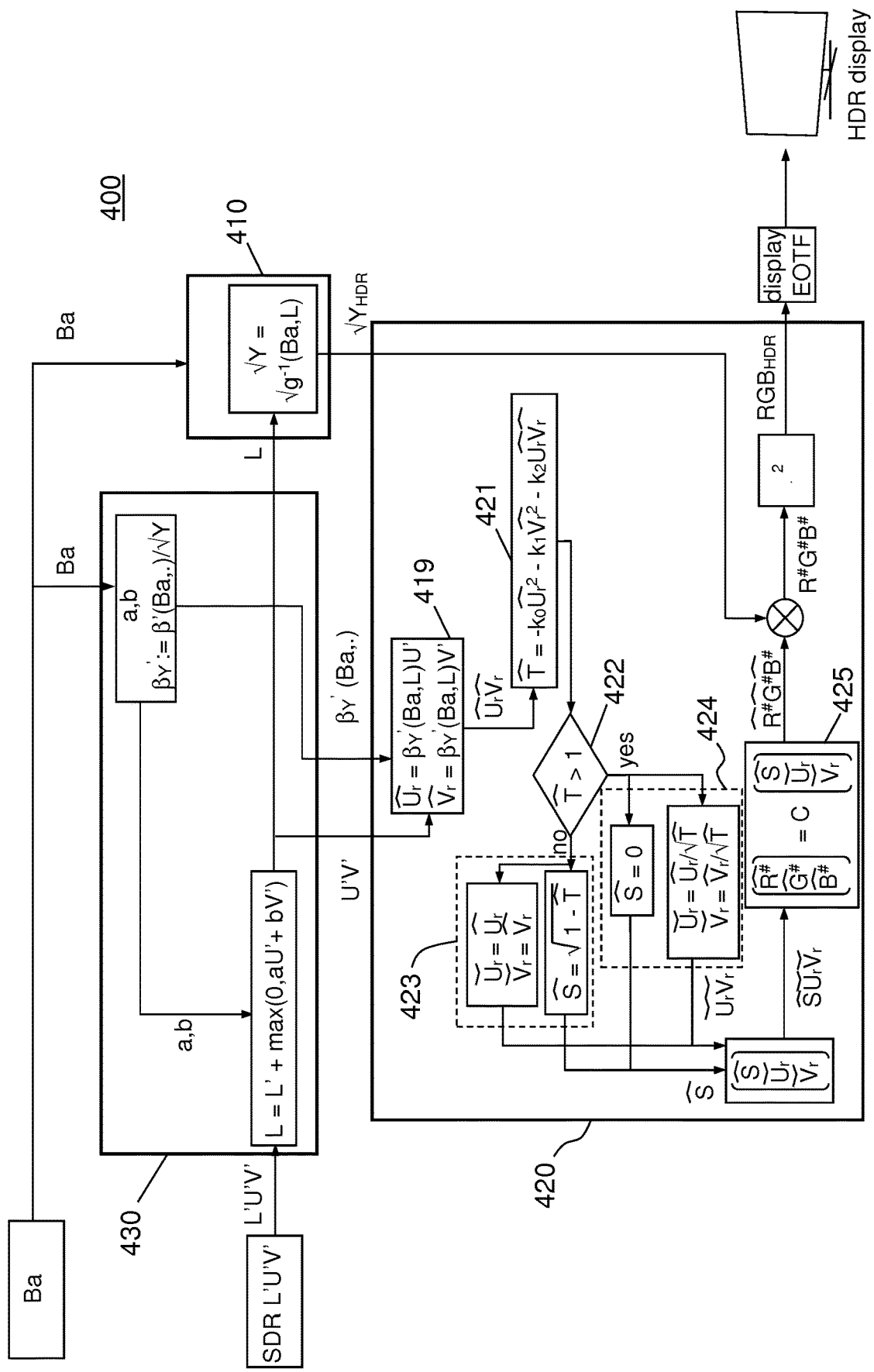
FIG. 4 shows schematically a diagram of the steps of a method of decoding a color picture from at least one bitstream in accordance with yet another embodiment of the disclosure.

Referring now to FIG. 4, a diagram of the steps of a method 400 of decoding a color picture from at least one bitstream in accordance with another embodiment of the disclosure is schematically shown. The shown embodiment actually a modification of the decoding method illustrated in FIG. 3, now additionally ascertaining that if the second component, corresponding to g shown in FIG. 3, results in an imaginary value, the exception is handled correctly, e.g. in order to avoid visible distortions of the displayed color associated to the corresponding pixel. Only changes between the embodiments will be explained in detail. Steps 410 and 430 are identical to steps 310 and 330 respectively. Step 425 is similar to step 223. Step 426 is similar to step 224.

The mapping is supposed to provide L'U'V' that are decodable in the sense that S is not imaginary. However, because the L'U'V' is compressed and de-compressed, coding loss may lead to an input triplet (L',U'V') such that $1-\hat{T}:=1+k_0\hat{U}_r^2+k_1\hat{V}_r^2+k_2\hat{U}_r\hat{V}_r$ is negative and $\hat{S}=\sqrt{1-\hat{T}}$ is not real. One solution is to threshold $\hat{T}$ by 1, leading to $\hat{S}=0$. However, this destroys the luminance bound on decoded RGB. Replacing an imaginary value by $\hat{S}=0$ is equivalent to increasing Y. For instance, if one gets $\hat{T}=2$, doubling Y leads to $\hat{S}=\sqrt{2-2}=0$. But in this case, the bound Y on RGB has also doubled. This leads to very bright pixels appearing where $\hat{S}$ is set to zero without further handling.

As shown in step 420, the following process is additionally performed in order to preserve the bound while finding a solution. In a sub-step 419, $\hat{U}_r, \hat{V}_r$ are determined by multiplying decoded U'V' by $\beta_Y'(Ba,L)$.

The second component $\hat{S}$ is determined in separate sub-steps. In sub-step 421, only $\hat{T}$, i.e. a linear combination linear combination of a product and square values of two chrominance components is determined. In a next sub-step 422, it is checked, whether or not $1-\hat{T}$ results in a positive or negative value.

If $\hat{T} \leq 1$, then $\hat{S}$ is real and the decoding proceeds with this $\hat{S}$ (sub-step 423), which corresponds to the processing shown in FIG. 3.

If $\hat{T}>1$, then S is imaginary and the processing continues with sub-step 424, where the variables $\hat{U}_r$ and $\hat{V}_r$ are re-scaled in order to get a real solution by doing the following set $\check{U}_r=\hat{U}_r/\sqrt{\hat{T}}$ and $\check{V}_r=\hat{V}_r/\sqrt{\hat{T}}$ replace $\hat{U}_r, \hat{V}_r$ by $\check{U}_r, \check{V}_r$ in the remaining of the decoding set $\hat{S}=0$ The described processing provides a suitable solution, which becomes evident when analyzing the problem geometrically: The equation $$Y = A_1 \begin{bmatrix} R^{\#2} \\ G^{\#2} \\ B^{\#2} \end{bmatrix}$$

defines an ellipsoid in the $R^\#G^\#B^\#$ space, and $$\begin{bmatrix} A_2 \\ A_3 \end{bmatrix} \begin{bmatrix} R^\# \\ G^\# \\ B^\# \end{bmatrix} = \begin{bmatrix} U_r \\ V_r \end{bmatrix}$$

defines the intersection of two planes, i.e. a line, in the same space. Therefore, the solution is the intersection of the ellipsoid and the line. This intersection is either empty in the case S is imaginary one point in the case S=0, the line is tangent to the ellipsoid two points in the case S>0, and the positive value has to been take because $R^\#G^\#B^\#$ are positive by definition In a further sub-step 425, $\widehat{R^\#}\ \widehat{G^\#}\ \widehat{B^\#}$ are recovered from $\hat{S}\hat{U}_r\hat{V}_r$ similarly to step 223.

Figure 5:
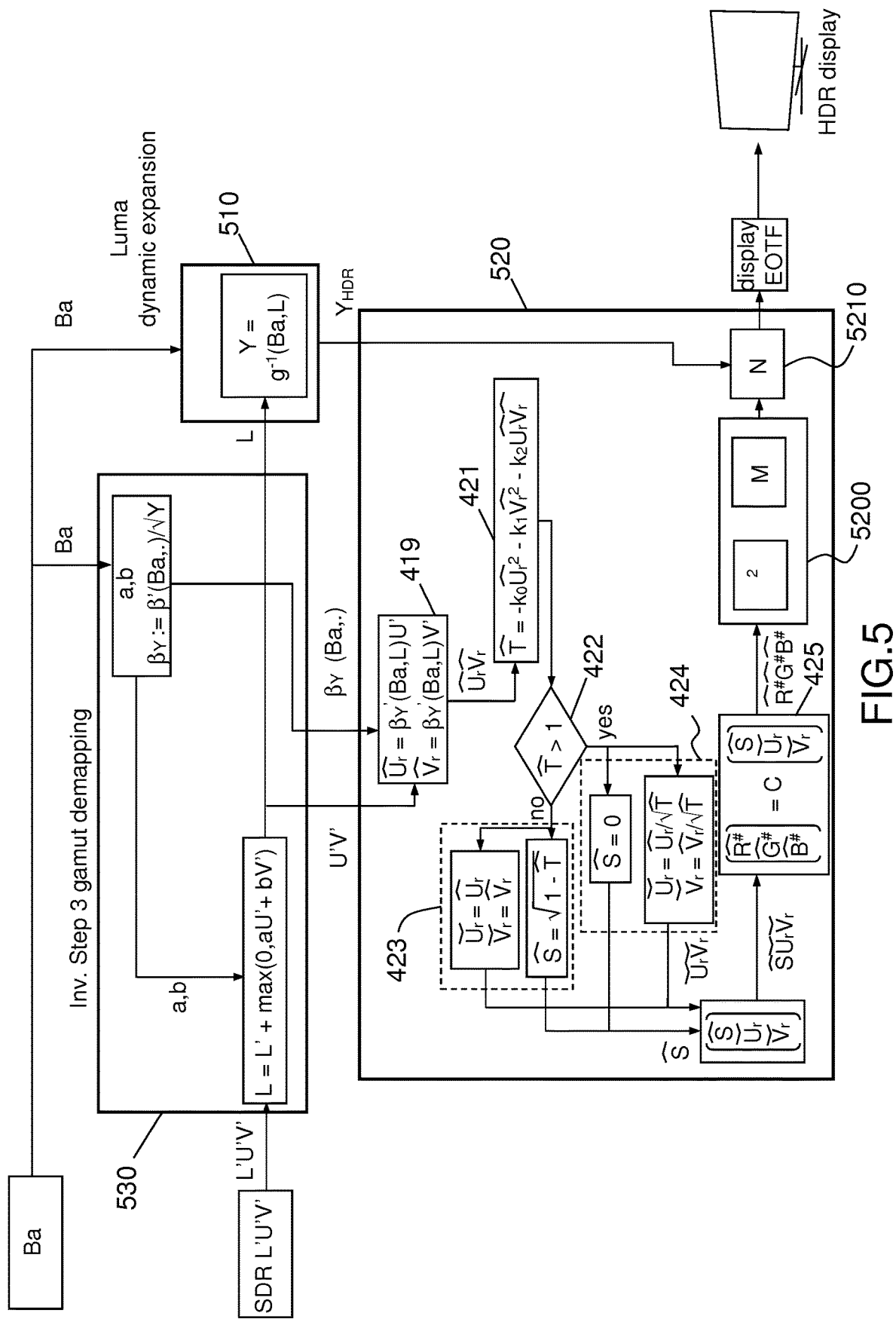
FIGS. 5 to 10 depicts flowcharts of a method of decoding a color picture from at least one bitstream in accordance with a plurality of embodiments.

Referring now to FIG. 5, a diagram of the steps of a method 500 of decoding a color picture from at least one bitstream in accordance with another embodiment of the disclosure is schematically shown. The shown embodiment is actually a modification of the decoding method illustrated in FIG. 4. Namely, the multiplication of the intermediate $R^\#, G^\#, B^\#$ values by the square root of the reconstructed linear luminance signal (i.e. by $\sqrt{Y_{HDR}}$) is removed.

Only changes between the embodiments will be explained in detail. Step 530 is identical to step 430.

In step 510, a nonlinear dynamic expansion function is applied to the luminance L in order to generate a first component $Y_{HDR}$ which is an expanded range luminance. The dynamic expansion function $g^{-1}$ is an inverse of a dynamic reduction function g that has been applied to an original luminance component obtained when encoding the color picture, e.g. $Y_{HDR}=g^{-1}(Ba,L_{SDR})$. In this case thus, the luminance $Y_{HDR}$ is obtained instead of its square root as in step 410 of the embodiment of FIG. 4.

The step 520 is an amended version of step 320 of FIG. 3 or of step 420 of FIG. 4. The steps of FIG. 5 identical (i.e. the steps up to the obtention of $\widehat{R^\#}\ \widehat{G^\#}\ \widehat{B^\#}$) to the steps of FIGS. 3 and 4 are not further disclosed. In this embodiment, the decoded $\widehat{R^\#}\ \widehat{G^\#}\ \widehat{B^\#}$ are not scaled back by a multiplication by $\sqrt{Y}$ as in the embodiments of FIGS. 3 and 4.

In a step S200, $\widehat{R^\#}\ \widehat{G^\#}\ \widehat{B^\#}$ are first squared and then multiplied by a matrix M in order to obtain $(x_{norm}, z_{norm})$ color components of the known CIE 1931 XYZ color space. M is a [2×3] matrix defined as a part of a $M_{3\times3}$ matrix known in the art for mapping a signal from RGB to XYZ color space.

In a step S210, a color conversion matrix is applied. More precisely, the vector $(x_{norm}, 1, z_{norm})^t$ is first multiplied by $Y_{HDR}$ obtained at step 510 and then by a 3×3 matrix N. N is a 3×3 matrix known in the art for mapping a signal from XYZ to RGB color space. N is thus the inverse of $M_{3\times3}$.

This embodiment offers several advantages. First, the luminance component undergoes less processes (e.g. no square root). Second, the luminance and chrominance components are processed separately. Therefore, the reconstructed HDR luminance is more accurate, i.e. closer to the original luminance. Third, at most three components are processed at each steps. In the previous embodiments, four components (e.g. $\widehat{R^\#}\ \widehat{G^\#}\ \widehat{B^\#}$ and $\sqrt{Y_{HDR}}$) are processed thus requiring more memory.

Figure 6:
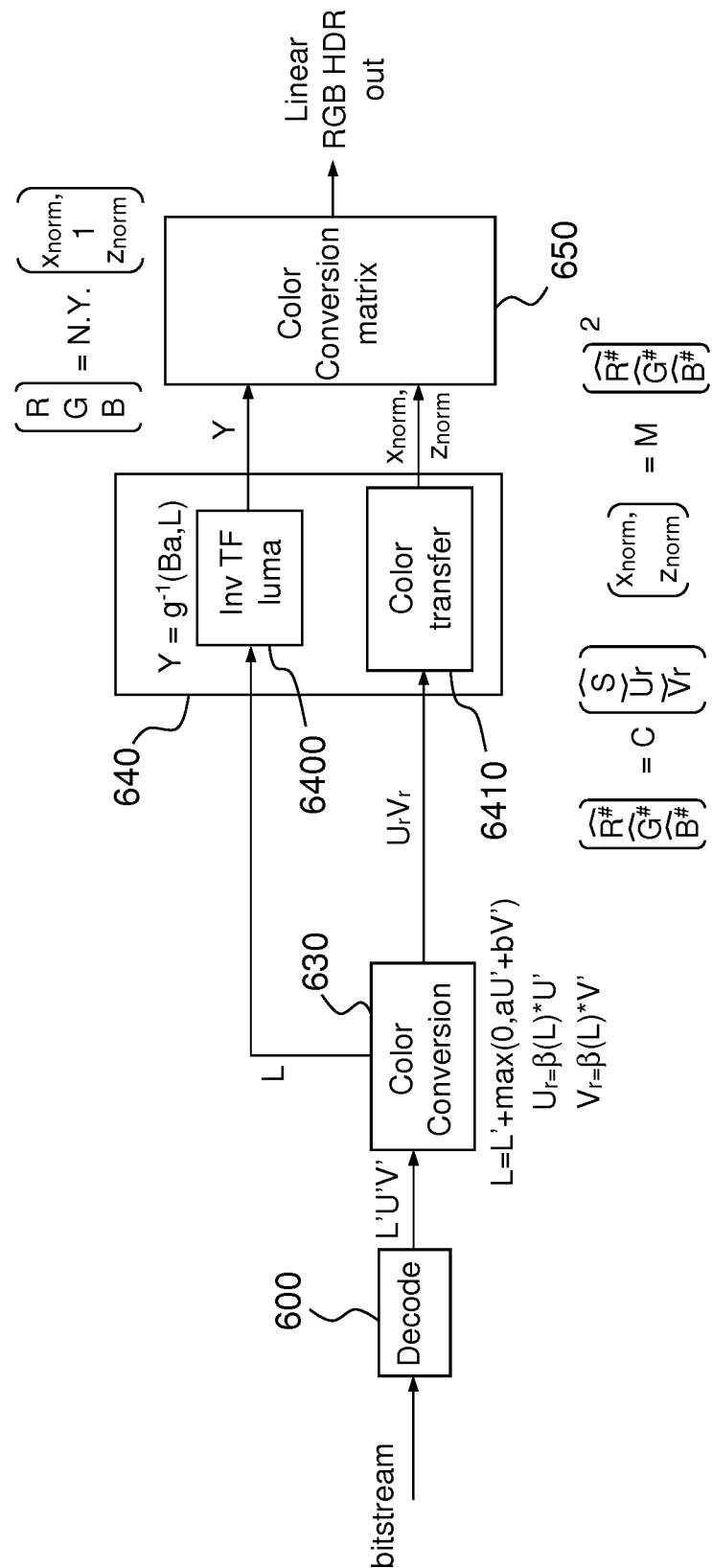

FIG. 6 is another representation of the embodiment of FIG. 5. On the contrary to the embodiment disclosed with respect to FIG. 4, the multiplication of the intermediate decoding $R^\#, G^\#, B^\#$ values by the square root of the reconstruction linear luminance signal is removed.

Instead, the reconstruction of the chrominance and luminance values of a given pixel are done in two separate processing paths (channels). Their mixing is done in the very last step of the decoding process, so as to provide the reconstruction HDR RGB linear signal.

In step 600, the bitstream is decoded into L'U'V' component representative of the SDR content. The decoding is for example compliant with the HEVC video coding standard.

In step 630, the L'U'V' are color converted into converted LUrVr components. Color conversion typically takes the form of a 3×3 matrix, possibly with an additional "max" operator on the luminance. This step aims at modifying the color components while keeping the SDR dynamic. This step comprises for example the sub-steps of step 530 and in addition the step 419. In step 640, the converted LUrVr components representative of the SDR content are then converted into components representative of the HDR content (known as inverse transfer process). This step comprises an inverse transfer operation which is different depending on the component. In an exemplary embodiment, in step 6400, the luminance L is processed in a separate channel. The "Inv TF Luma" 6400 thus decodes the luminance HDR signal in the linear-light domain:

$$Y_{HDR} = g^{-1}(Y_{dec}, Ba))$$

where $Y_{dec}$ is the luma value provided by the video decoder (e.g. an HEVC decoder), and $g^{-1}$ is the inverse of the non-linearity that was applied onto the linear-light HDR luminance on the encoder side.

In step 6410, the two normalized color component value $(x_{norm}, z_{norm})$ in the CIE XYZ color space are reconstructed as a function of the input $(U_r, V_r)$ chroma values obtained at step 630. In an exemplary embodiment, this step comprises:

Calculation of T as previously explained with respect to FIG. 5 (step 421).

Calculation of S as a function of T, as previously explained with respect to FIG. 5 (steps 423 and 424).

Calculation of intermediate $(\widehat{R^\#}\ \widehat{G^\#}\ \widehat{B^\#})$ value, through applying the YUV-to-RGB 3×3 matrix transform onto $(S, U_r, V_r)$ component values (step 425).

Calculation to the resulting $(x_{norm}, z_{norm})$ in the CIE XYZ color space, by applying the RGB-to-XZ 2×3 matrix transform onto squared $(\widehat{R^\#}\ \widehat{G^\#}\ \widehat{B^\#})$ color values (step S200).

In step 650, a color conversion matrix is applied on the Y and $(x_{norm}, z_{norm})$ components. In an exemplary embodiment, applying a "Color Conversion Matrix" comprises the following operation:

$$(R, G, B)^t = N \cdot Y_{HDR} \cdot (x_{norm}, 1, x_{norm})^t$$

where N is a 3×3 matrix, $Y_{HDR}$ is the luminance obtained from the inverse luminance transfer function (step 6400), $(x_{norm}, z_{norm})$ are the color component samples obtained from the "color transfer" (step 6410).

Figure 7:
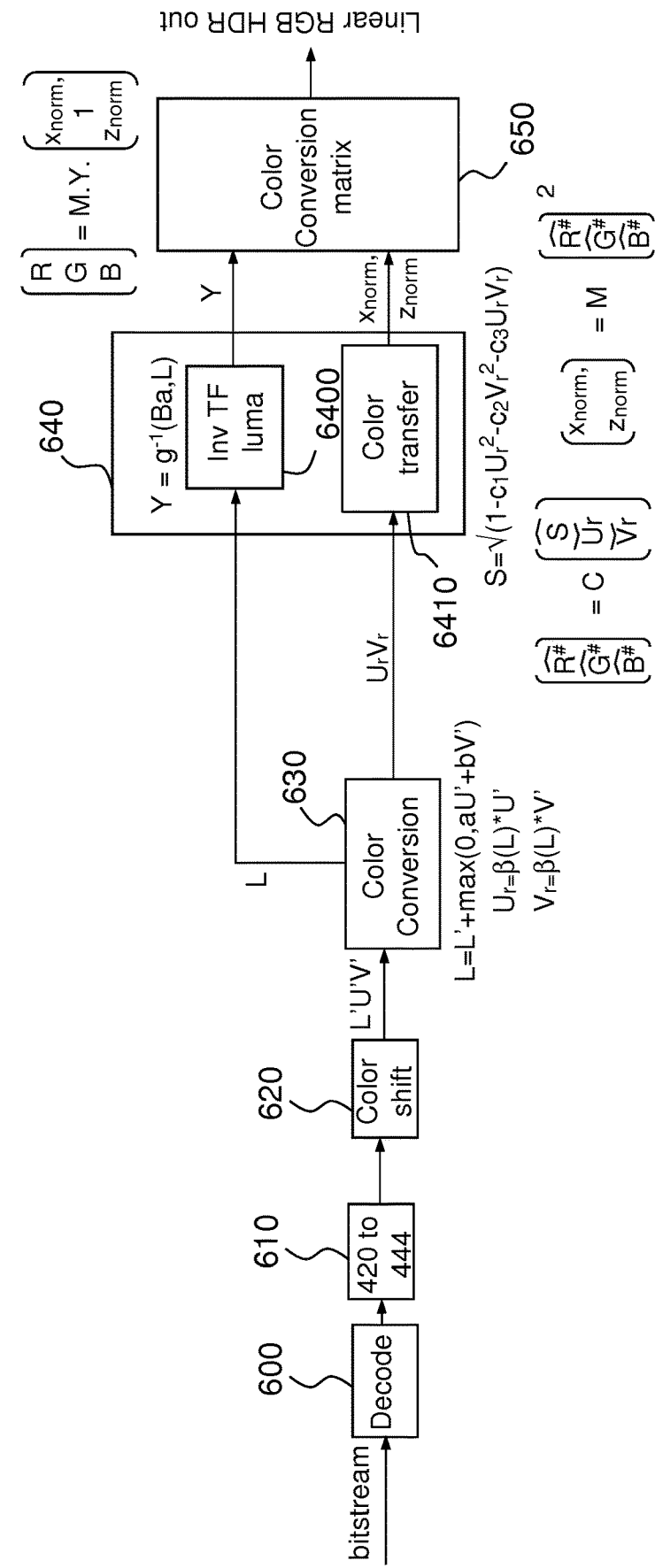

As depicted on FIG. 7, in an optional step 610, the components are converted from 420 to 444 format.

In an optional step 620, the UV components are shifted around 0 by subtracting 512 from the decoded U and V values. The shifted values are denoted $U_c V_c$.

FIGS. 6 and 7 are thus a high-level diagram of the diagram disclosed with respect to FIG. 5. Some steps in FIG. 6 may thus be replaced by others processes than the ones disclosed with respect to FIG. 5.

Figure 8:
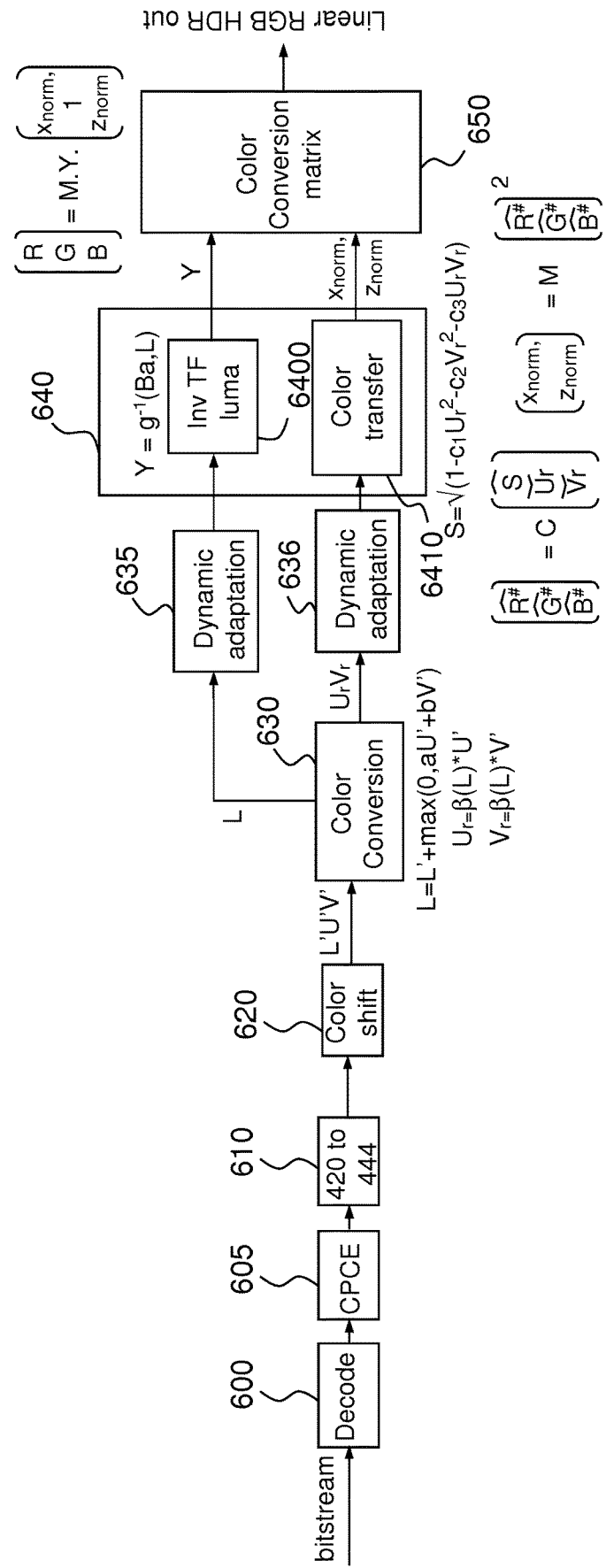

In another embodiment depicted on FIG. 8, the proposed decoding scheme comprises additional element such as a "Cross-Plane Color Enhancement" module 605 and a "Dynamic range Adaptation" modules 635 and 636. These additional decoding steps are disclosed in the following Mpeg contribution "*Response to Call for Evidence for HDR and WCG Video Coding: Arris, Dolby and InterDigital*", Arris Inc., Dolby Laboratories Inc. and InterDigital Communications, LLC ISO/IEC JTC1/SC29/WG11 MPEG2015/M36264, June 2015, Warsaw, Poland".

The CPCE decoding step consists in a color and luminance components high-pass filtering process, which makes the decoded picture closer to its original version on the encoder side. It can be placed in the decoding process at any several places (before or after module 610 or even after module 630).

The signal dynamic range adaptation consists in a multiplicative factor and then additive offset applied on one or more signal component, in order to make the signal represented in a more efficient way for compression efficiency. The dynamic range adaptation may also be placed before or after the module 610.

Figure 9:
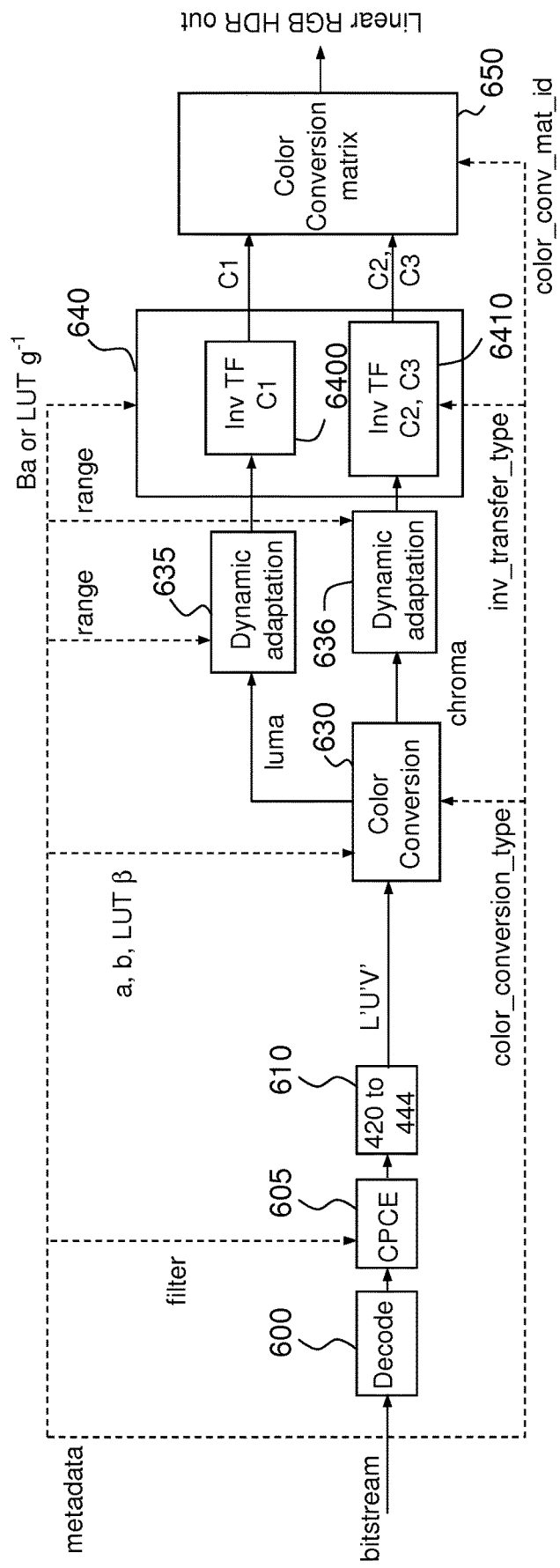

The new decoder architecture proposed with respect to FIG. 6, 7 or 8, is adapted to fit a unified, generic HDR decoding architecture, which is illustrated on the FIG. 9. The FIG. 9 depicts generic decoding modules and the associated metadata received from the HDR video coder.

Figure 10:
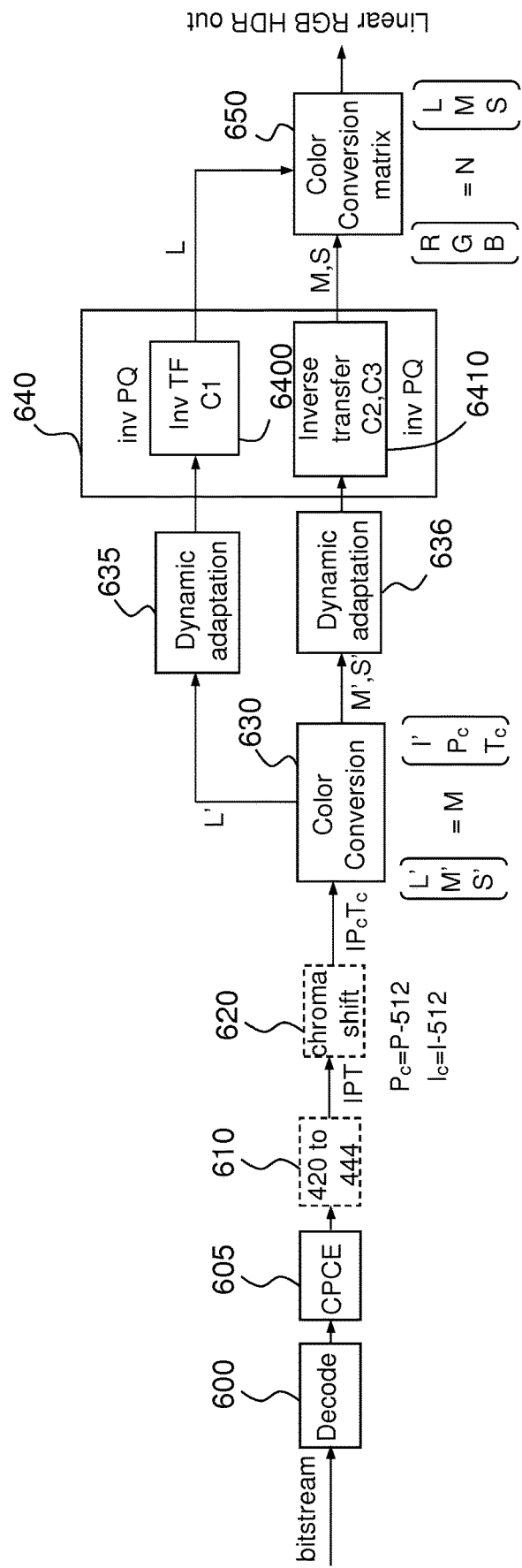

In this unified architecture, the generic modules 630, 640 and 650 may implement different operations. Depending on information from the metadata (e.g. color_conversion_type) one operation is applied instead of the other. The color conversion step 630 typically takes the form of a 3×3 matrix, possibly with an additional "max" operator on the luminance. It is parametrize by a flag color_conversion_type that indicates the color conversion type. According to a first flag value, color correction can take the form of the previously described color correction (such as the step 530 and 419 disclosed with respect to FIG. 5). In another embodiment, the color correction consists in a color space conversion from the IPT to the LMS color space as specified in the document "*Response to Call for Evidence for HDR and WCG Video Coding: Arris, Dolby and InterDigital*", Arris Inc., Dolby Laboratories Inc. and InterDigital Communications, LLC ISO/IEC JTC1/SC29/WG11 MPEG2015/M36264, June 2015, Warsaw, Poland" as disclosed on FIG. 10. In the first case, color conversion is parametrized by the a,b parameters and β" lookup-table, which can be received as metadata from the coded stream.

The first component inverse transfer step 6400 comprises applying the inverse non-linearity onto the luminance coded signal, which is the Y component of the YUV space, or the L component of the LMS, according to the value of flag inv_transfer_type. In case of the YUV color space, the inverse transfer function may be parametrize, through a Look-Up table of a single Ba parameter, which can be received from the bit-stream together with the syntax element inv_transfer_type.

The second and third component inverse transfer step 6410 is also specified through a received syntax element inv_transfer_type. It may consist in the previously described color correction according to a value of this syntax element. According to another flag value, it may consist in applying the inverse non-linearity onto the components (M,S) of the LMS color space (*MPEG*2015/*M*36264, June 2015, Warsaw, Poland"]).

The application of the color conversion matrix step 650 comprises transforming the decoded signal from the color used for the de-compression into the output linear-light RGB color space. Again, according to the value of a dedicated syntax element color_conv_mat_id, this may take the form of the (XYZ-to-RGB) or the (LMS-to-RGB) color space conversion.

It should be noted that the metadata on the top FIG. 9 (e.g. a, b, LUT β, Ba) depends on the type of color conversion, inverse transfer and color matrix conversion applied. Therefore, in some configurations these metadata are not present and are thus not used.

The syntax element disclosed above color_conversion_type, inv_transfer_type and color_conv_mat_id may be encoded in a SEI message (SEI is the English acronym for "Supplement Enhancement Information"). They may be defined as binary flag.

In FIGS. 1 to 10, the steps and sub-steps may also be considered as modules or functional units, which may or may not be in relation with distinguishable physical units. For example, these modules or some of them may be brought together in a unique component or circuit, or contribute to functionalities of a software. A contrario, some modules may potentially be composed of separate physical entities. The apparatus which are compatible with the disclosure are implemented using either pure hardware, for example using dedicated hardware such ASIC or FPGA or VLSI, respectively «Application Specific Integrated Circuit», «Field-Programmable Gate Array», «Very Large Scale Integration», or from several integrated electronic components embedded in a device or from a blend of hardware and software components.

Figure 11:
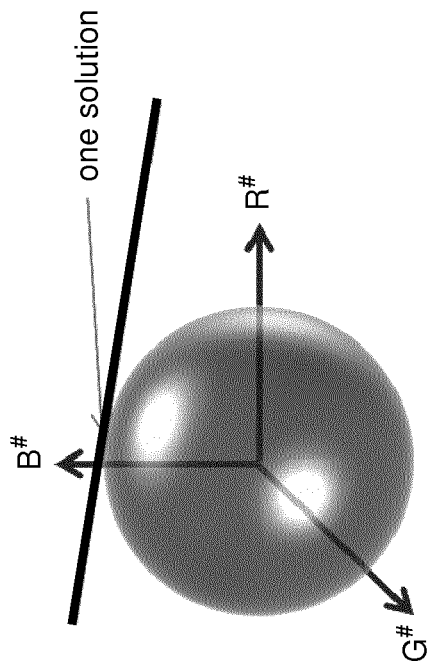
FIG. 11 illustrates possible solutions for intersections of a line and an ellipsoid in the $R^\#G^\#B^\#$ color space.
Figure 11:
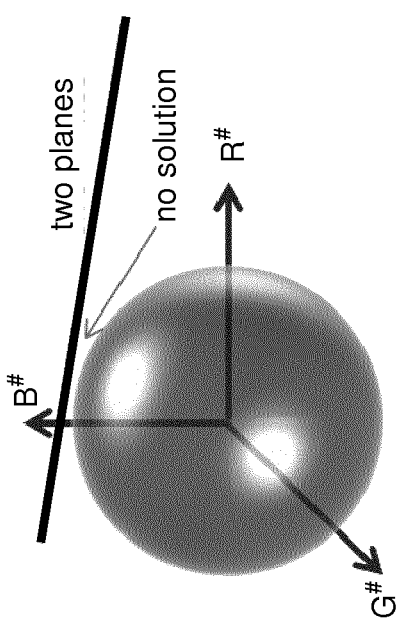

In FIG. 11, the ellipsoid and the line are shown in the $R^{\#}G^{\#}B^{\#}$ space. In FIG. 11, the ellipsoid is represented by a sphere. In case there is no solution, the line does not intersect the sphere (left). Setting S=0 is equivalent to increase, which itself is equivalent to inflate the ellipsoid that has $\sqrt{Y}$ as a radius. The chosen solution illustrated in FIG. 11 is to move the line up to a point it touches the ellipsoid (right). Then, by construction, the solution $R^{\#}G^{\#}B^{\#}$ is on the ellipsoid of radius $\sqrt{Y}$ and the bound is preserved.

According to other of its aspects, the disclosure relates to devices comprising a processor configured to implement the above methods, a computer program product comprising program code instructions to execute the steps of the above methods when this program is executed on a computer, a processor readable medium having stored therein instructions for causing a processor to perform at least the steps of the above methods, and a non-transitory storage medium carrying instructions of program code for executing steps of the above methods when said program is executed on a computing device.

Figure 12:
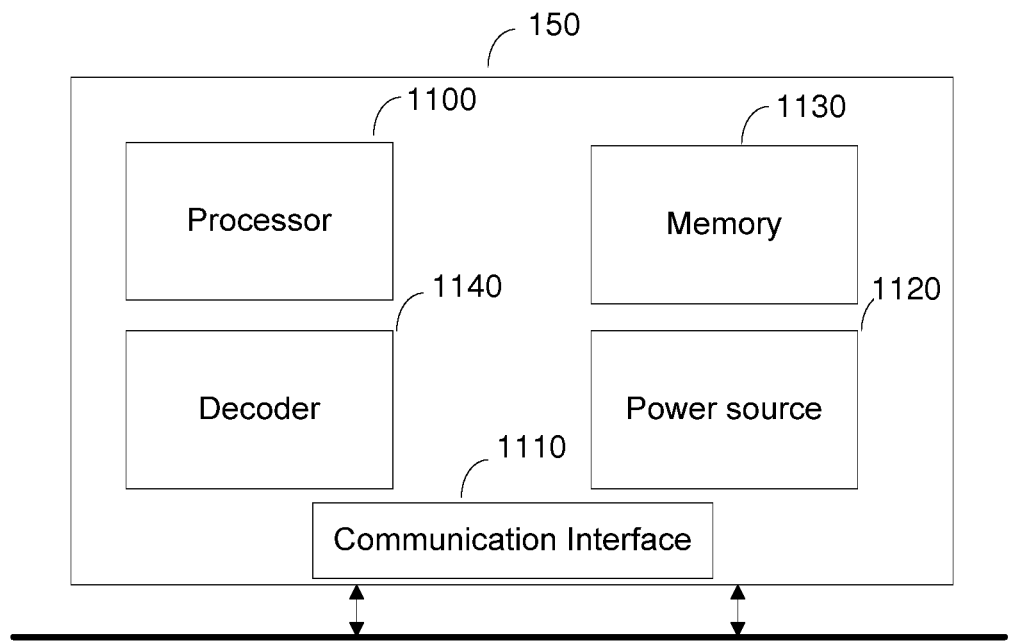
FIG. 12 shows an example of an architecture of a receiver in accordance with an embodiment of the disclosure.

FIG. 12 represents an exemplary architecture of the receiver 150 configured to decode a HDR picture from a stream according to a non-limiting embodiment.

The receiver 150 comprises one or more processor(s) 1100, which could comprise, for example, a CPU, a GPU and/or a DSP (English acronym of Digital Signal Processor), along with internal memory 1510 (e.g. RAM, ROM and/or EPROM). The receiver 150 comprises one or more communication interface(s) 1110, each adapted to display output information and/or allow a user to enter commands and/or data (e.g. a keyboard, a mouse, a touchpad, a webcam); and a power source 1120 which may be external to the receiver 150. The receiver 150 may also comprise one or more network interface(s) (not shown). Decoder module 1140 represents the module that may be included in a device to perform the decoding functions. Additionally, decoder module 1140 may be implemented as a separate element of the receiver 150 or may be incorporated within processor(s) 1100 as a combination of hardware and software as known to those skilled in the art.

The stream may be obtained from a source. According to different embodiments, the source can be, but not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an picture capturing circuit (e.g. a sensor such as, for example, a CCD (or Charge-Coupled Device) or CMOS (or Complementary Metal-Oxide-Semiconductor)).

According to different embodiments, the decoded HDR picture may be sent to a destination, e.g. a display device. As an example, the decoded HDR picture is stored in a remote or in a local memory, e.g. a video memory or a RAM, a hard disk. In a variant, the decoded HDR picture is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the receiver 150 further comprises a computer program stored in the memory 1130. The computer program comprises instructions which, when executed by the receiver 150, in particular by the processor 1100, enable the receiver to execute to least one of the decoding methods described with reference to FIGS. 2 to 10. According to a variant, the computer program is stored externally to the receiver 150 on a non-transitory digital data support, e.g. on an external storage medium such as a HDD, CD-ROM, DVD, a read-only and/or DVD drive and/or a DVD Read/Write drive, all known in the art. The receiver 150 thus comprises a mechanism to read the computer program. Further, the receiver 150 could access one or more Universal Serial Bus (USB)-type storage devices (e.g., "memory sticks.") through corresponding USB ports (not shown).

According to exemplary and non-limiting embodiments, the receiver 150 can be, but not limited to:
- a mobile device;
- a communication device;
- a game device;
- a set top box;
- a TV set;
- a tablet (or tablet computer);
- a laptop;
- a display and
- a decoding chip.

Figure 13:
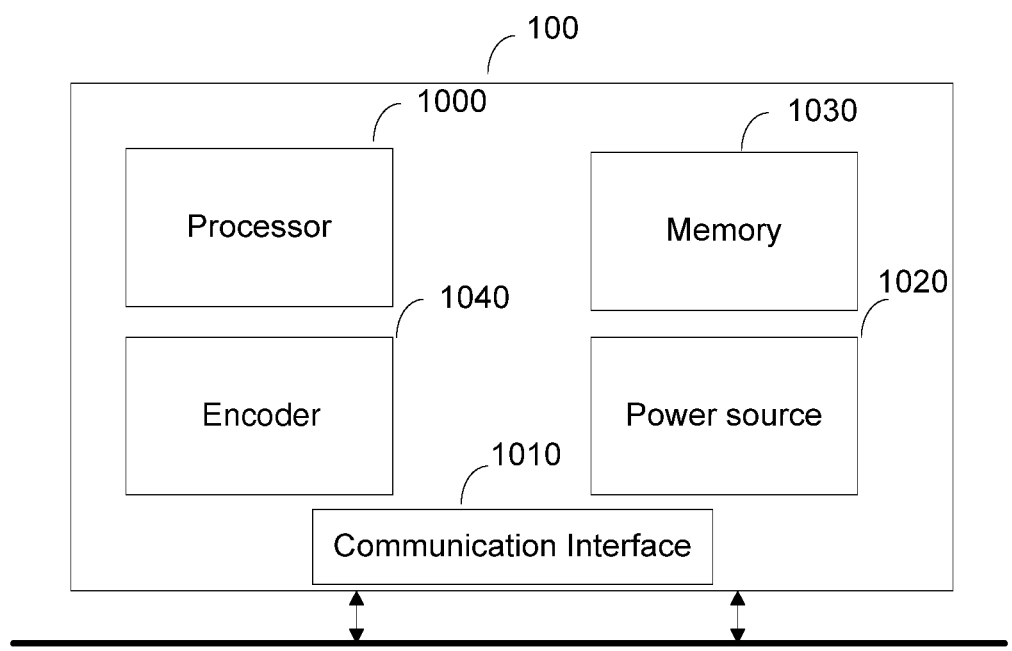
FIG. 13 shows an example of an architecture of a transmitter in accordance with an embodiment of the disclosure.

FIG. 13 represents an exemplary architecture of the transmitter 100 configured to encode a picture in a stream according to a non-limiting embodiment.

The transmitter 100 comprises one or more processor(s) 1000, which could comprise, for example, a CPU, a GPU and/or a DSP (English acronym of Digital Signal Processor), along with internal memory 1030 (e.g. RAM, ROM, and/or EPROM). The transmitter 100 comprises one or more communication interface(s) 1010, each adapted to display output information and/or allow a user to enter commands and/or data (e.g. a keyboard, a mouse, a touchpad, a webcam); and a power source 1020 which may be external to the transmitter 100. The transmitter 100 may also comprise one or more network interface(s) (not shown). Encoder module 1040 represents the module that may be included in a device to perform the coding functions. Additionally, encoder module 1140 may be implemented as a separate element of the transmitter 100 or may be incorporated within processor(s) 1000 as a combination of hardware and software as known to those skilled in the art.

The picture to be coded may be obtained from a source. According to different embodiments, the source can be, but is not limited to:
- a local memory, e.g. a video memory, a RAM, a flash memory, a hard disk;
- a storage interface, e.g. an interface with a mass storage, a ROM, an optical disc or a magnetic support;
- a communication interface, e.g. a wireline interface (for example a bus interface, a wide area network interface, a local area network interface) or a wireless interface (such as a IEEE 802.11 interface or a Bluetooth interface); and
- an image capturing circuit (e.g. a sensor such as, for example, a CCD (or Charge-Coupled Device) or CMOS (or Complementary Metal-Oxide-Semiconductor)).

According to different embodiments, the stream may be sent to a destination. As an example, the stream is stored in a remote or in a local memory, e.g. a video memory or a RAM, a hard disk. In a variant, the stream is sent to a storage interface, e.g. an interface with a mass storage, a ROM, a flash memory, an optical disc or a magnetic support and/or transmitted over a communication interface, e.g. an interface to a point to point link, a communication bus, a point to multipoint link or a broadcast network.

According to an exemplary and non-limiting embodiment, the transmitter 100 further comprises a computer program stored in the memory 1030. The computer program comprises instructions which, when executed by the transmitter 100, in particular by the processor 1000, enable the transmitter 100 to execute the encoding method described with reference to FIG. 1. According to a variant, the computer program is stored externally to the transmitter 100 on a non-transitory digital data support, e.g. on an external storage medium such as a HDD, CD-ROM, DVD, a read-only and/or DVD drive and/or a DVD Read/Write drive, all known in the art. The transmitter 100 thus comprises a mechanism to read the computer program. Further, the transmitter 100 could access one or more Universal Serial Bus (USB)-type storage devices (e.g., "memory sticks.") through corresponding USB ports (not shown).

According to exemplary and non-limiting embodiments, the transmitter 100 can be, but is not limited to:
- a mobile device;
- a communication device;
- a game device;
- a tablet (or tablet computer);
- a laptop;
- a still image camera;
- a video camera;
- an encoding chip;
- a still image server; and
- a video server (e.g. a broadcast server, a video-on-demand server or a web server).

The implementations described herein may be implemented in, for example, a method or a process, an device, a software program, a data stream, or a signal. Even if only discussed in the context of a single form of implementation (for example, discussed only as a method or a device), the implementation of features discussed may also be implemented in other forms (for example a program). An device may be implemented in, for example, appropriate hardware, software, and firmware. The methods may be implemented in, for example, an device such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications, particularly, for example, equipment or applications. Examples of such equipment include an encoder, a decoder, a post-processor processing output from a decoder, a pre-processor providing input to an encoder, a video coder, a video decoder, a video codec, a web server, a set-top box, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette ("CD"), an optical disc (such as, for example, a DVD, often referred to as a digital versatile disc or a digital video disc), a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may produce a variety of signals formatted to carry information that may be, for example, stored or transmitted. The information may include, for example, instructions for performing a method, or data produced by one of the described implementations. For example, a signal may be formatted to carry as data the rules for writing or reading the syntax of a described embodiment, or to carry as data the actual syntax-values written by a described embodiment. Such a signal may be formatted, for example, as an electromagnetic wave (for example, using a radio frequency portion of spectrum) or as a baseband signal. The formatting may include, for example, encoding a data stream and modulating a carrier with the encoded data stream. The information that the signal carries may be, for example, analog or digital information. The signal may be transmitted over a variety of different wired or wireless links, as is known. The signal may be stored on a processor-readable medium.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application.

The invention claimed is:

1. A decoding method comprising:
decoding one standard dynamic range luminance component L' and two standard dynamic range chrominance components U' and V' from a bitstream produced by an encoder;
color converting the standard dynamic range luminance component L' into L and the two decoded standard dynamic range chrominance components U' and V' into Ur and Vr, respectively, as follows:

$$L=L'+\max(0,aU'+bV'),\ Ur=\beta(L)*U',\ Vr=\beta(L)*V'$$

where a and b are constants and where $\beta(L)$ is a parameter that depends on L;
applying independently:
a dynamic expansion function on the color converted standard dynamic range luminance component L to obtain a high dynamic range luminance component Y, wherein the dynamic expansion function is an inverse of a dynamic reduction function applied to a high dynamic range luminance component on the encoder's side; and
a color transfer operation on the color converted standard dynamic range chrominance components Ur and Vr to obtain a first intermediate high dynamic range chrominance component and a second intermediate high dynamic range chrominance component in an intermediate color space; and
applying a color conversion matrix on the high dynamic range luminance component Y, the first intermediate high dynamic range chrominance component and the second intermediate high dynamic range chrominance component to obtain a high dynamic range picture in RGB color space.

2. The method according to claim 1, wherein applying the dynamic expansion function on the color converted standard dynamic range luminance component L to obtain the high dynamic range luminance component Y comprises determining:

$$Y=g^{-1}(Ba,L))$$

where Ba is a modulation value and $g^{-1}(\ )$ is the inverse of the dynamic reduction function applied to the high dynamic range luminance component on the encoder's side.

3. The method according to claim 1, wherein applying a color conversion matrix on the high dynamic range luminance component Y, the first intermediate high dynamic range chrominance component and the second intermediate high dynamic range chrominance component to obtain the high dynamic range picture in RGB color space comprises:

calculating T as a linear combination of $Ur^2,Vr^2$ and $Ur*Vr$;
calculating S as $\sqrt{1-T}$ where $T\leq 1$ and setting S to 0 and dividing Ur and Vr by $\sqrt{T}$ otherwise;
calculating intermediate $(R^\#,G^\#,B^\#)$ components in RGB color space by applying a color conversion matrix on S, Ur, and Vr.

4. A decoder comprising a communication interface configured to access a bitstream produced by an encoder and at least one processor configured to:
decode one standard dynamic range luminance component L' and two standard dynamic range chrominance components U' and V' from a bitstream;
color convert the standard dynamic range luminance component L' into L and the two decoded standard dynamic range chrominance components U' and V' into Ur and Vr, respectively, as follows:

$$L=L'+\max(0,aU'+bV'),\ Ur=\beta(L)*U',\ Vr=\beta(L)*V'$$

where a and b are constants and where $\beta(L)$ is a parameter that depends on L;
apply independently:
a dynamic expansion function on the color converted standard dynamic range luminance component L to obtain a high dynamic range luminance component Y, wherein the dynamic expansion function is an inverse of a dynamic reduction function applied to a high dynamic range luminance component on the encoder's side; and
a color transfer operation on the color converted standard dynamic range chrominance components Ur and Vr to obtain a first intermediate high dynamic range chrominance component and a second intermediate high dynamic range chrominance component in an intermediate color space; and
apply a color conversion matrix on the high dynamic range luminance component Y, the first intermediate high dynamic range chrominance component and the second intermediate high dynamic range chrominance component to obtain a high dynamic range picture in RGB color space.

5. The decoder according to claim 4, wherein to apply the dynamic expansion function on the color converted standard dynamic range luminance component L to obtain the high dynamic range luminance component Y comprises determining:

$$Y=g^{-1}(Ba,L))$$

where Ba is a modulation value and $g^{-1}(\ )$ is the inverse of the dynamic reduction function applied to the high dynamic range luminance component on the encoder's side.

6. The decoder according to claim 4, wherein to apply the color conversion matrix on the high dynamic range luminance component Y, the first intermediate high dynamic range chrominance component and the second intermediate high dynamic range chrominance component to obtain the high dynamic range picture in RGB color space comprises:

calculating T as a linear combination of $Ur^2,Vr^2$ and $Ur*Vr$;
calculating S as $\sqrt{1-T}$ where $T\leq 1$ and setting S to 0 and dividing Ur and Vr by $\sqrt{T}$ otherwise;
calculating intermediate $(R^\#,G^\#,B^\#)$ components in RGB color space by applying the color conversion matrix on S, Ur, and Vr.

7. A non-transitory computer readable medium with instructions stored therein which, upon execution, instruct at least one processor to:
- decode one standard dynamic range luminance component L' and two standard dynamic range chrominance components U' and V' from a bitstream produced by an encoder;
- color convert the standard dynamic range luminance component L' into L and the two decoded standard dynamic range chrominance components U' and V' into Ur and Vr, respectively, as follows:

$$L = L' + \max(0, aU' + bV'), \quad Ur = \beta(L)*U', Vr = \beta(L)*V'$$

where a and b are constants and where $\beta(L)$ is a parameter that depends on L;
- apply independently:
  - a dynamic expansion function on the color converted standard dynamic range luminance component L to obtain a high dynamic range luminance component Y, wherein the dynamic expansion function is an inverse of a dynamic reduction function applied to a high dynamic range luminance component on the encoder's side;
  - a color transfer operation on the color converted standard dynamic range chrominance components Ur and Vr to obtain a first intermediate high dynamic range chrominance component and a second intermediate high dynamic range chrominance component in an intermediate color space; and
- apply a color conversion matrix on the high dynamic range luminance component Y, the first intermediate high dynamic range chrominance component and the second intermediate high dynamic range chrominance component to obtain a high dynamic range picture in RGB color space.

8. The non-transitory computer readable medium according to claim 7, wherein to apply the dynamic expansion function on the color converted standard dynamic range luminance component L to obtain the high dynamic range luminance component Y comprises determining:

$$Y = g^{-1}(Ba, L))$$

where Ba is a modulation value and $g^{-1}(\ )$ is the inverse of the dynamic reduction function applied to the high dynamic range luminance component on the encoder's side.

9. The non-transitory computer readable medium according to claim 7, wherein to apply the color conversion matrix on the high dynamic range luminance component Y, the first intermediate high dynamic range chrominance component and the second intermediate high dynamic range chrominance component to obtain the high dynamic range picture in RGB color space comprises:
- calculating T as a linear combination of $Ur^2, Vr^2$ and $Ur*Vr$;
- calculating S as $\sqrt{1-T}$ where $T \leq 1$ and setting S to 0 and dividing Ur and Vr by $\sqrt{T}$ otherwise;
- calculating intermediate $(R^\#, G^\#, B^\#)$ components in RGB color space by applying the color conversion matrix on S, Ur, and Vr.

* * * * *

UNITED STATES PATENT AND TRADEMARK OFFICE
CERTIFICATE OF CORRECTION

PATENT NO. : 11,070,830 B2
APPLICATION NO. : 15/754587
DATED : July 20, 2021
INVENTOR(S) : Fabrice Leleannec, Franck Galpin and Sebastien Lasserre It is certified that error appears in the above-identified patent and that said Letters Patent is hereby corrected as shown below:

In the Specification

Column 15, Line 31: replace "))" with --)--

In the Claims

Claim 2, Column 21, Line 57: replace "))" with --)--

Claim 3, Column 21, Line 62: replace "a" with --the--

Claim 5, Column 22, Line 50: replace "))" with --)--

Claim 8, Column 24, Line 11: replace "))" with --)--

Signed and Sealed this
Thirtieth Day of August, 2022

Katherine Kelly Vidal
*Director of the United States Patent and Trademark Office*